(12) United States Patent
Ishida et al.

(10) Patent No.: US 6,775,245 B1
(45) Date of Patent: Aug. 10, 2004

(54) DATA TRANSFER CONTROL DEVICE AND ELECTRONIC EQUIPMENT

(75) Inventors: Takuya Ishida, Suwa (JP); Takao Ogawa, Suwa (JP); Yoshiyuki Kamihara, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/426,588

(22) Filed: Oct. 25, 1999

(30) Foreign Application Priority Data

Oct. 27, 1998 (JP) .......................................... 10-321541

(51) Int. Cl.⁷ .............................................. H04L 12/28
(52) U.S. Cl. .................... 370/257; 370/389; 370/395.7; 370/419
(58) Field of Search ................................ 370/254, 257, 370/389, 401, 402, 256, 408, 412, 413, 419, 420, 421, 428, 462, 463, 395.7; 710/22, 52, 305, 306, 308, 309, 310

(56) References Cited

U.S. PATENT DOCUMENTS 5,621,898 A * 4/1997 Wooten ....................... 370/462
6,233,242 B1 * 5/2001 Mayer et al. ................ 370/412

FOREIGN PATENT DOCUMENTS

| JP | 59-501435 | 8/1984 |
| JP | 2-310649 | 12/1990 |
| JP | 10-135985 | 5/1998 |
| JP | 10-285223 | 10/1998 |
| WO | WO 84/00835 | 3/1984 |

OTHER PUBLICATIONS

Hoe et al, Start–Jr: A Parallel System from Commodity Technology, MIT, Computation Structures Group Memo 384, pp. 1–17, Oct. 1, 1996.*

Texas Instruments, TSB12LV31 Data Manual, IEEE 1394–1995 General–Purpose Link–Layer Controller, pp. 1–73, Sep. 1998.*

Fujitsu, IEEE 1394 Serial Bus Controller, pp. 1–30, Nov. 1996.*

"An Outline of the IEEE 1394 High Performance Serial Bus", Interface, Apr. 1996, pp. 114–123.

"Bus Standards for PC Peripheral Equipment", Interface, Jan. 1997, pp. 106–116.

"Real–Time Transfer Modes and Multimedia–Capable Protocols for IEEE 1394–1995 (Fire Wire)", Interface, Jan. 1997, pp. 136–146.

* cited by examiner

Primary Examiner—Frank Duong
(74) Attorney, Agent, or Firm—Oliff & Berridge, PLC

(57) ABSTRACT

The objective is to provide a data transfer control device and electronic equipment that are capable of reducing processing overheads, thus enabling high-speed data transfer within a compact hardware configuration. In addition to a FIFO, an internal RAM capable of storing packets in a randomly accessible manner is provided between a link core and a CPU in a data transfer control device conforming to the IEEE 1394 standard. The RAM storage area is divided into a header area, a data area, and a CPU work area, and the header and data areas are divided into areas for reception and transmission. Tags are used to write the header of a receive packet to the header area and the data thereof to the data area. The data area is divided into areas for isochronous transfer and asynchronous transfer. Pointers are provided for controlling the size of each area in RAM variably, and the size of each area can be varied dynamically after power is switched on. Each area has a ring buffer structure. The size of area storing the header or data of one packet is fixed.

37 Claims, 30 Drawing Sheets

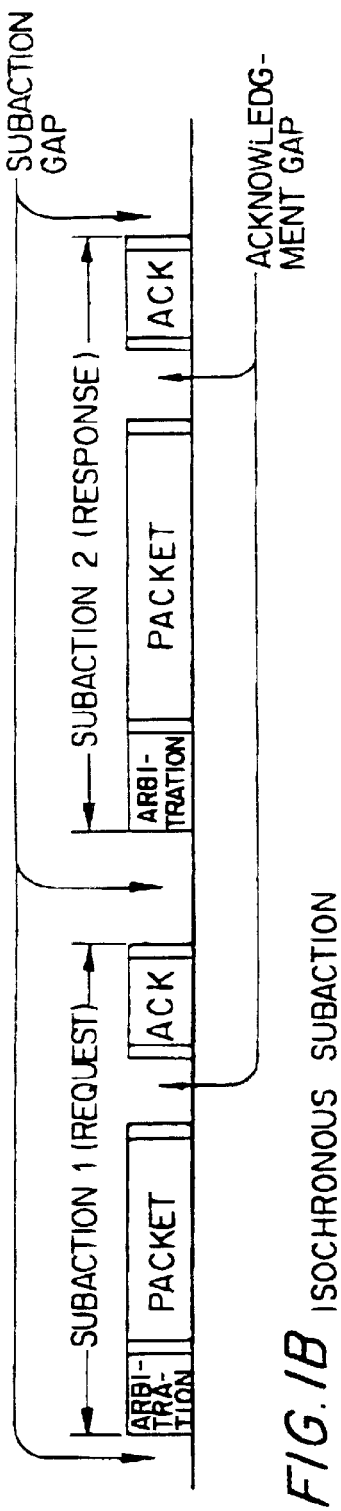
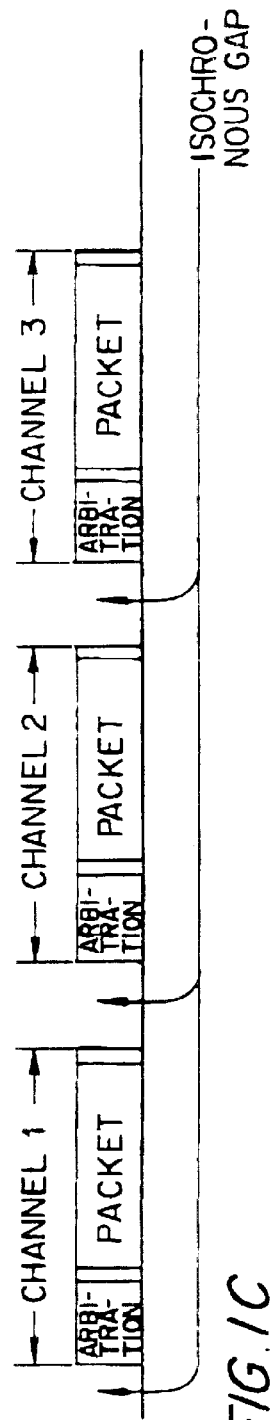
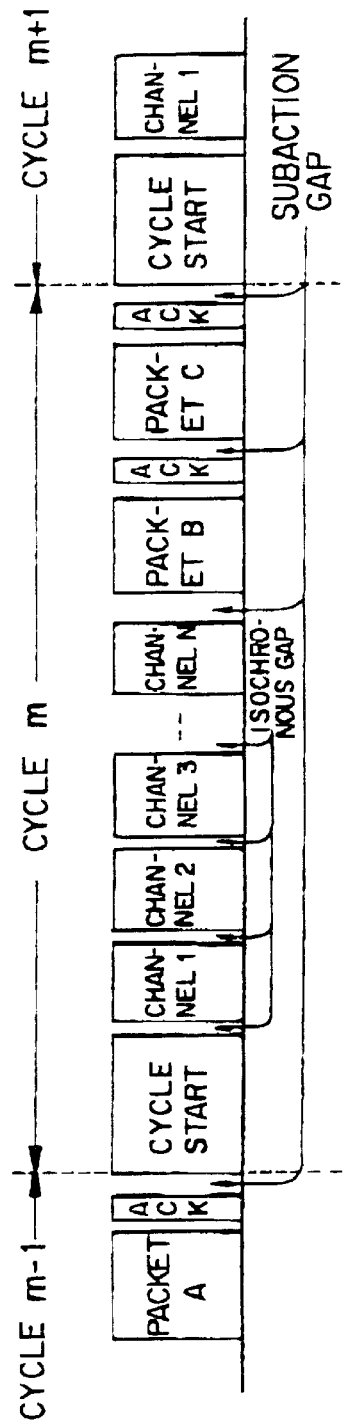
FIG. 1A ASYNCHRONOUS SUBACTION
FIG. 1B ISOCHRONOUS SUBACTION
FIG. 1C

FIG. 4A

SELF-ID PACKET # 0

| b.31 | | | | | | | | | | | | b.0 |
|---|---|---|---|---|---|---|---|---|---|---|---|---|
| 0 | 10 | PHY_ID | 0 | L | gap_cnt | sp | del | C | pwr | p0 | p1 | p2 | i | m |
| 1 | LOGICAL INVERSE OF FIRST QUADLET ||||||||||||

FIG. 4B

SELF-ID PACKETS # 1, # 2, # 3

| b.31 | | | | | | | | | | | | | b.0 |
|---|---|---|---|---|---|---|---|---|---|---|---|---|---|
| 0 | 10 | PHY_ID | 1 | n | rsv | pa | pb | pc | pd | pe | pf | pg | ph | r | m |
| 1 | LOGICAL INVERSE OF FIRST QUADLET |||||||||||||

FIG. 4C

LINK-ON PACKET

| b.31 | | | | | | | | b.0 |
|---|---|---|---|---|---|---|---|---|
| 0 | 01 | PHY_ID | 0000 | 0000 | 0000 | 0000 | 0000 | 0000 |
| 1 | LOGICAL INVERSE OF FIRST QUADLET ||||||||

FIG. 4D

PHY CONFIGURATION PACKT

| b.31 | | | | | | | | | b.0 |
|---|---|---|---|---|---|---|---|---|---|
| 0 | 00 | PHY_ID | R | T | gap_cnt | 0000 | 0000 | 0000 | 0000 |
| 1 | LOGICAL INVERSE OF FIRST QUADLET |||||||||

COMPARATIVE EXAMPLE

THIS EMBODIMENT

FIG. 16

| TAG (DTAG) | MEANING |
|---|---|
| 0 0 | HEADER |
| 0 1 | TRAILER |
| 1 0 | DATA |
| 1 1 | START |

RAM (PACKET STORAGE MEANS)

RAM (PACKET STORAGE MEANS)

FIG. 27

TxAsynchronousPacket    BlockWriteReq,BlockReadResp,LockReq,LockResp

| b.31 | | | | | | b.0 |
|---|---|---|---|---|---|---|
| 0 | spd | tl | rt | tcode | pri | |
| 1 | DestinationID | (MSB) | | | | |
| 2 | PacketTypeSpecInfo | | | | | (LSB) |
| 3 | DataLength | | ExtendedTcode | | | |
| 4 | DataPointer | | | | | |
| 5 | reserved | | | | | |
| 6 | | | | | | |
| 7 | | | | | | ACK |

DATA TRANSFER CONTROL DEVICE AND ELECTRONIC EQUIPMENT

BACKGROUND OF THE INVENTION

1. Field of the Invention

The present invention relates to a data transfer control device and electronic equipment comprising the same.

2. Description of Related Art

An interface standard called IEEE 1394 has recently been attracting much attention. This IEEE 1394 has standardized high-speed serial bus interfaces that can handle the next generation of multimedia devices. IEEE 1394 makes it possible to handle data that is required to have real-time capabilities, such as moving images. A bus in accordance with IEEE 1394 can be connected not only to peripheral equipment for computers, such as printers, scanners, CD-R drives, and hard disk drives, but also to domestic appliances such as video cameras, VTRs, and TVs. This standard is therefore expected to enable a dramatic acceleration of the digitalization of electronic equipment.

The concept of IEEE 1394 is disclosed in various publications, such as "An outline of the IEEE 1394 High Performance Serial Bus" (*Interface,* April 1996, pages 1 to 10), "Bus Standers for PC Peripheral Equipment" (*Interface,* January 1997, pages 106 to 116), and "Real-Time Transfer Modes and Multimedia-Capable Protocols for IEEE 1394-1995 (FireWire)" (*Interface,* January 1997, pages 136 to 146). Texas Instruments' TSB12LV31 is known as a data transfer control device that conforms to IEEE 1394.

However, some technical problems have been identified with such a data transfer control device conforming to IEEE 1394, as described below.

That is to say, the current IEEE 1394 standard does make it possible to implement transfer speeds up to a maximum of 400 Mbps in practice, however, the presence of processing overheads forces the actual transfer speeds of entire system to be much slower. In other words, the firmware and application software running on a CPU require large amounts of time for processes such as preparing for transmitting data and reading in received data, which means it is not possible to implement high-speed data transfer overall, no matter how fast the data can be transferred over the IEEE 1394.

A particular problem lies in the fact that a CPU incorporated into peripheral equipment has a lower processing capability than the CPU incorporated into the host system, such as a personal computer. This makes the problem of processing overheads in the firmware and application software extremely serious. It is therefore desirable to provide techniques that are capable of efficiently solving this overhead problem.

SUMMARY OF THE INVENTION

The present invention was devised in the light of the above described technical problem, and has as an objective thereof the provision of a data transfer control device and electronic equipment using the same which are capable of reducing the processing overheads of firmware and application software, thus implementing high-speed data transfer within a compact hardware.

In order to solve the above described technical problems, a first aspect of the present invention relates to a data transfer control device for transferring data among a plurality of nodes that are connected to a bus, the data transfer control device comprising: link means for providing a service for transferring packets between nodes; storage means for storing packets, the storage means being randomly accessible; write means for writing to the storage means a packet that is being transferred from each of the nodes via the link means; and read means for reading out a packet that has been written to the storage means by an upper layer, and transferring-the packet to the link means.

With this aspect of the invention, packets that are being transferred from another node are written by the write means to a randomly accessible storage means. Packets that have been written to the storage means by an upper layer, such as firmware or application software, are read out by the read means and transferred to the link means. They are then transferred to other nodes Thus, in accordance with the present invention, the randomly accessible storage means for storing packets is interposed between the link means and the upper layers. This configuration makes it possible to store packets in any desired storage area within the storage means, regardless of the reception sequence or transmission sequence of the packets. This also makes it possible to divide the packets and store the resultant parts in a plurality of areas within the storage means.

In a second aspect of the present invention, the storage means is divided into a control information area for storing packet control information and a data area for storing packet data. This arrangement makes it possible to reduce the processing load on the firmware or application software in the upper layers, thus enabling an improvement in the actual transfer speeds of the entire system. It also simplifies the processing for reading packets from the storage means and writing packets to the storage means.

In a third aspect of the present invention, the storage means is divided into an area in which a packet is stored and a work area for a central processing unit. This reduces the storage capacity required of the local memory of the central processing unit; possibly even removing the need for local memory completely.

In a fourth aspect of the present invention, the control information area of the storage means is divided into a control information area for reception and a control information area for transmission. This arrangement makes it possible to read packet control information continuously from the control information area for reception and also write packet control information continuously to the control information area for transmission, simplifying the processing and reducing the processing load.

A fifth aspect of the present invention further comprises packet division means for writing packet control information to the control information area and writing packet data to the data area. This ensures that packet control information and packet data are automatically written to the control information area and data area, respectively, enabling a reduction in overheads in the upper layers, such as firmware.

In a sixth aspect of this invention, the link means generates tag information for delimiting at least control information and data of a packet, and also links the tag information to a packet, and the packet division means writes packet control information to the control information area and writes packet data to the data area, based on the tag information that has been linked to the packet. This arrangement makes it possible to store packet control information in the control information area and data in the data area, with a simple hardware configuration.

In a seventh aspect of this invention, the data area of the storage means is divided into a data area for reception and a data area for transmission. This arrangement makes it possible to read out receive data continuously from the data area for reception and write transmission data continuously to the data area for transmission, enabling a reduction in processing overheads on the upper layers.

In an eighth aspect of this invention, the data area of the storage means is divided into a data area for isochronous transfer and a data area for asynchronous transfer. This arrangement makes it possible to ensure that an isochronous packet has priority in processing, even if the isochronous packet has been transferred after an asynchronous packet. It is therefore possible to maintain the real-time capabilities of processing required for isochronous transfers.

In a ninth aspect of this invention, the data area of the storage means comprises a data area for asynchronous transfer; and the data area for asynchronous transfer is divided into a plurality of areas including first and second data areas for asynchronous transfer. This arrangement makes it possible to store data having different purposes in a plurality of areas within the data area for asynchronous transfer. In other words, control-related data such as command data and status data can be stored in the first data area for asynchronous transfer, for example, and data such as data that is to be output, stored, or taken in by an application can be stored in the second data area for asynchronous transfer. It is therefore possible to store data that is to be output, stored, or taken in by an application, continuously in the second data area for asynchronous transfer, enabling a reduction in the processing load on the upper layers In a tenth aspect of this invention, the data area of the storage means is divided into a data area for isochronous transfer and a first data area for asynchronous transfer, and the data area for isochronous transfer is used as a second data area for asynchronous transfer. This means that the data area for isochronous transfer can be used as the second data area for asynchronous transfer, when an application does not use isochronous transfers. In addition, data for different purposes can be stored separately in the first and second data areas for asynchronous transfer. As a result, it is possible to reduce the processing load on the upper layers, while utilizing limited resources efficiently.

In an eleventh aspect of this invention, the data area of the storage means is divided into a plurality of areas; and the data transfer control device further comprises means for writing packet data to any one of the divided areas, based on packet control information. This arrangement makes it possible to store data for different purposes separately in a plurality of separated areas. As a result, the processing load on the upper layers can be reduced.

A twelfth aspect of this invention further comprises means for variably controlling a size of each area, when the storage means is divided into a plurality of areas. This enables the optimal area partitioning in accordance with the application, making it possible to utilize limited resources efficiently.

In a thirteenth aspect of this invention, a size of each of the areas can be controlled variably and dynamically after power has been applied. This makes it possible to utilize limited resources efficiently, even when reception processing and transmission processing are mixed together.

In a fourteenth aspect of this invention, on condition that the storage means is divided into a plurality of areas, at least one of packet control information and packet data is stored within a divided area from a first boundary to a second boundary thereof, and the storage point of the at least one of packet control information and packet data returns to the first boundary when said storage point reaches the second boundary. This arrangement makes it possible for a randomly accessible storage means to have a function of FIFO. When the storage point reaches the second boundary, the packet control information and data can be stored from the first boundary, making it possible to utilize limited resources efficiently.

In a fifteenth aspect of this invention, a size of an area for storing at least one of control information and data of one packet is fixed. This simplifies the handling of packets by the firmware or the like, enabling a reduction in the processing loads on the firmware or the like.

Note that this invention may comprise for a FIFO for reception and a FIFO for transmission that are provided between the link means and the storage means.

In a sixteenth aspect of this invention, the data transfer control device comprises: a first bus connected to a next stage application; a second bus for controlling the data transfer control device; a third bus connected electrically to a physical-layer device; a fourth bus connected electrically to the storage means; and arbitration means for performing arbitration for establishing a data path between any one of the first, second, and third buses and the fourth bus.

In this aspect of the invention, mutually separate first, second, and third buses are provided. The arbitration performed by the arbitration means sets up a data path between one of the first, second, and third buses and the fourth bus. This arrangement makes it possible to store packets that have been received from another node via a physical-layer device, in any desired disposition within the storage means. In addition, the reading and writing of packet control information is done using the second bus, so that the first bus can be used for reading and writing the data in the packets. This enables a reduction in the processing load on the upper layers, such as the transaction layer and application layer. It also makes it possible to utilize low-speed buses as the first and second buses and a low-speed, inexpensive device as the device for controlling the data transfer control device As a result, the data transfer control device can be made more compact and less expensive Note that it is sufficient to connect electrically the first, second, third, and fourth buses to the application, a device for controlling the data transfer control device, physical-layer device, and storage means respectively, and other devices can exist on these buses.

It is preferable that data transfer according to this invention is performed in accordance with the IEEE 1394 standard.

Electronic equipment in accordance with this invention comprises any one of the above-described data transfer control devices; a device for performing given processing on data that has been received from another node via the data transfer control device and the bus; and a device for outputting or storing data that has been subjected to said processing. Electronic equipment in accordance with a further aspect of this invention comprises: any one of the above described data transfer control devices; a device for performing given processing on data that is to be sent to another node via the data transfer control device and the bus; and a device for taking in data to be subjected to said processing.

With these aspects of the invention, it is possible to speed up the processing in the electronic equipment for outputting or storing data that has been transferred from another node, or the processing the electronic equipment for transferring data that has been taken in to another node. These aspects of the invention make it possible to make the data transfer control device more compact and also reduce the processing loads on firmware that controls the data transfer, thus making it possible to produce electronic equipment that is less expensive and more compact.

BRIEF DESCRIPTION OF THE DRAWINGS

FIGS. 1A, 1B, and 1C are illustrative of the concepts of asynchronous transfer and isochronous transfer;

FIGS. 4A, 4B, 4C, and 4D show the formats of various physical-layer packets such as a self-ID packet;

FIG. 16 illustrates tags;

FIG. 27 shows the format of the header portion of an asynchronous send packet stored in the header area of RAM;

DESCRIPTION OF PREFERRED EMBODIMENTS

Figure 2A:
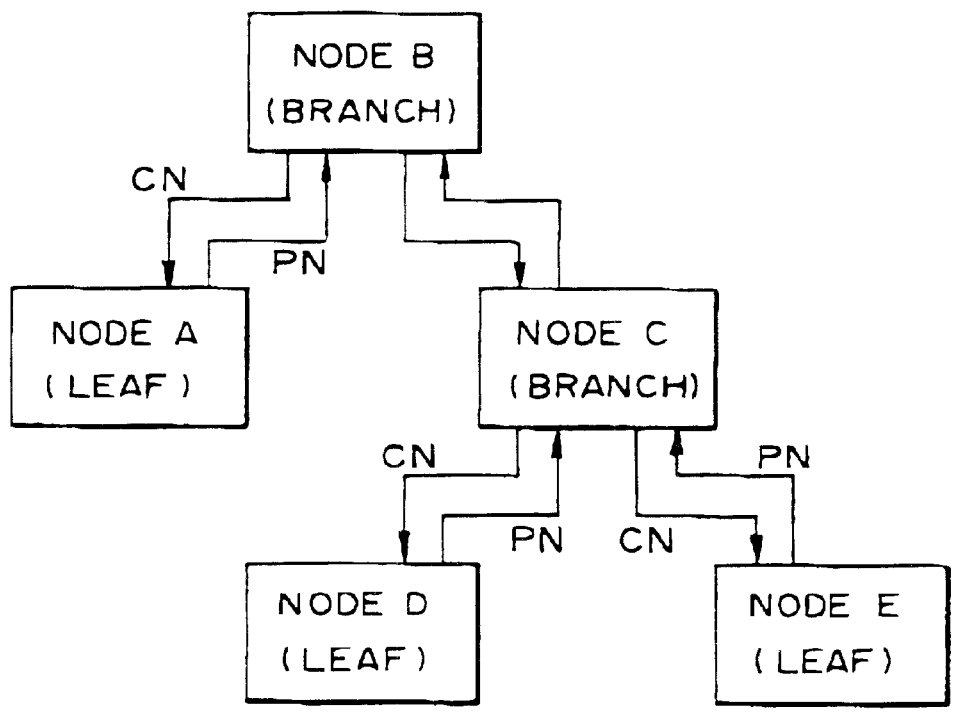
FIGS. 2A and 2B are illustrative of the concept of tree identification.

Preferred embodiments of this invention are described below with reference to the accompanying drawings.

1. IEEE 1394

The description first relates to an outline of IEEE 1394.

1.1 Data Transfer Speed and Connection Topology

The IEEE 1394 standard (IEEE 1394-1995, P1394-a) enables high-speed data transfer at 100 to 400 Mbps (P1394-b concerns 800 to 3,200 Mbps). It also permits the connection of nodes of different transfer speeds to the same bus.

The nodes are connected in a tree configuration in which a maximum of 63 nodes can be connected to one bus. Note that the use of bus bridges enables the connection of approximately 64,000 nodes.

When power is applied or devices have been disconnected or connected, a bus reset occurs and all information relating to connection topology is cleared thereby. After the bus reset, tree identification (determination of the root node) and self identification are performed. Subsequently, the management nodes such as the isochronous resource manager, cycle master, and bus manager are determined. Ordinary packet transfer then starts.

1.2 Transfer Methods IEEE 1394 provides for asynchronous transfer (suitable for data transfers where reliability is required) and isochronous transfer (suitable for transfers of data such as moving images and audio, where real-time capabilities are required), as packet transfer methods.

An example of an asynchronous subaction is shown in FIG. 1A. One subaction consists of arbitration, packet transfer, and acknowledgment. In other words, data transfer has precedence but first of all arbitration relating to the right of use of the bus takes place. A packet is then transferred from the source node (the originator of the transfer) to the destination node (the destination of the transfer). A source ID and a destination ID are comprised within the header of this packet. The destination node reads this destination ID and determines whether or not the packet is addressed to itself. If the destination node accepts the packet, it sends an acknowledgment (ACK) packet back to the source node.

There is an acknowledgment gap between the packet transfer and the ACK packet. There is also a subaction gap between one subaction and the next subaction. Arbitration for the next subaction cannot occur if a fixed bus idle time equivalent to this subaction gap has not elapsed. This prevents collisions between subactions.

An example of an isochronous subaction is shown in FIG. 1B. Since an isochronous transfer is performed as a broadcast (transfer to all nodes connected to the bus), no ACK is sent back when a packet is receive with isochronous transfer, packet transfer is performed by using channel numbers, not node IDS. Note that there is an isochronous gap between subactions.

The state of the bus during data transfer are shown in FIG. 1C. Isochronous transfer starts whenever the cycle master generates a cycle start packet at fixed intervals. This enables the transfer of at least one packet every 125 $\mu$s, for one channel. This makes it possible to transfer data that requires realtime capabilities, such as moving images or audio.

Asynchronous transfer occurs in intervals between isochronous transfers. In other words, isochronous transfer has a higher priority than asynchronous transfer. This is implemented by making the length of an isochronous gap shorter than the length of a subaction gap during asynchronous transfer, as shown in FIG. 1C.

1.3 Tree Identification

Tree identification is performed after a bus reset. During this tree identification, the parent-child relationships between nodes and the root node are determined.

First of all, each leaf node (a node that is connected to only one other node) sends a "parent-notify" to the adjacent node. If nodes A, B, C, D, and E are connected as shown in FIG. 2A, by way of example, parent-notify (PN) is sent from node A to node B and from nodes D and E to node C.

A node that has accepted a parent-notify recognizes that the originating node is its own child. It then sends a "child-notify" (CN) to that node. In the example shown in FIG. 2A, a child-notify is sent from node B to node A and from node C to nodes D and E. This determines the parent-child relationships between nodes B and A, nodes C and D, and nodes C and E.

Figure 2B:
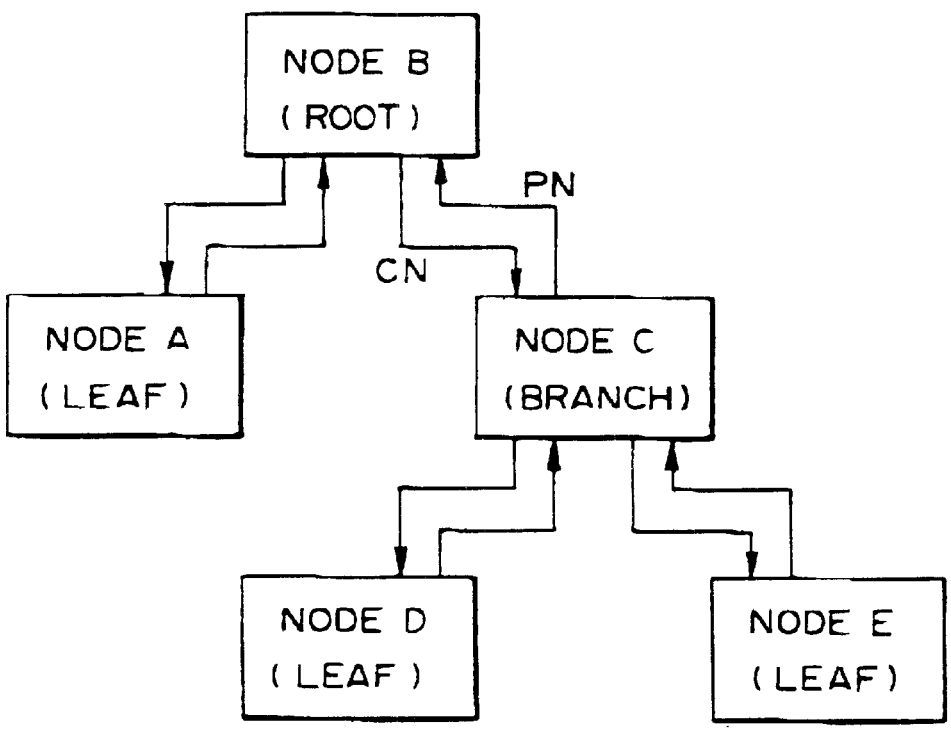

The parent-child relationship between nodes B and C is determined by which of them sends a parent-notify first. If, for example, node C sends the parent-notify first, node B becomes the parent and node C the child, as shown in FIG. 2B.

A node wherein all nodes connected to the ports thereof are own-children becomes the root. In FIG. 2B, node B has become the root. Note that IEEE 1394 allows for the possibility of any node becoming the root.

1.4 Self Identification

After tree identification, self identification is performed. During self-identification, self-ID packets are transferred in sequence starting from the nodes furthermost from the root node within the connection topology.

Figure 3:
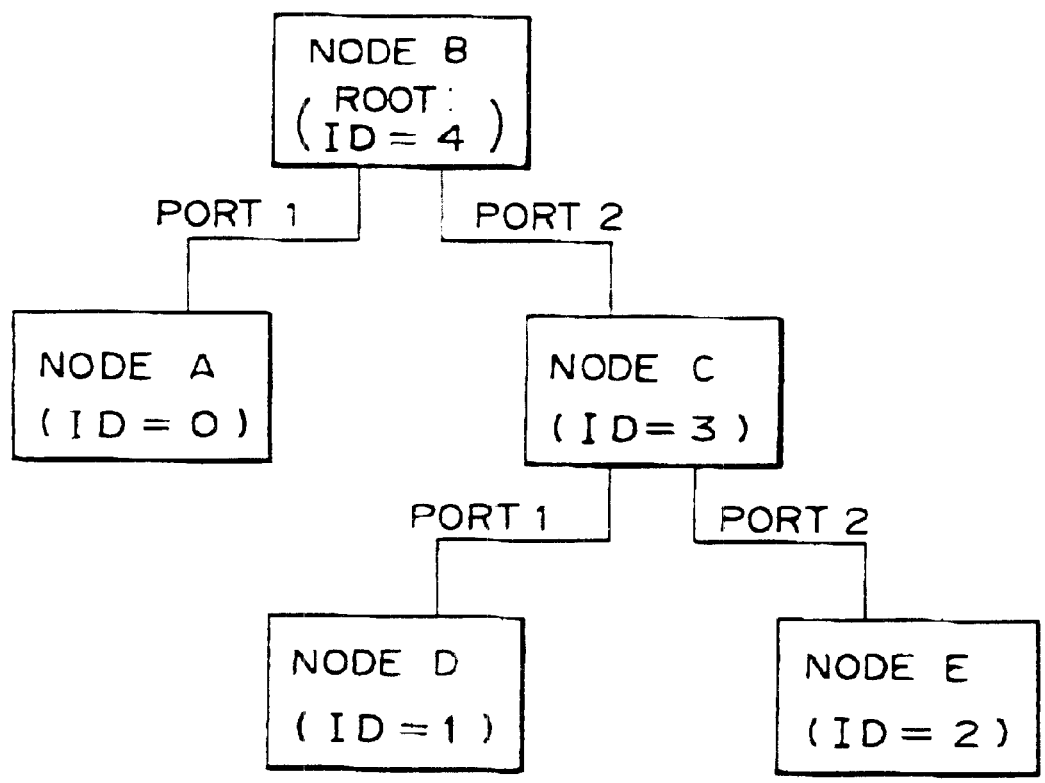
FIG. 3 is illustrative of the concept of self identification.

More specifically, node A, which is connected to port 1 (the port with the smaller number) of the root node B in the configuration shown by way of example in FIG. 3, first broadcasts a self-ID packet (self identification packet) to all the nodes.

Node C, which is connected to port 2 (the port with the larger number) of the root node B, is then selected and node D, which is connected to port 1 (the port with the smaller number) of node C, broadcasts a self-ID packet. Node E, which is connected to port 2 (the port with the larger number) of node C, then broadcasts a self-ID packet, followed by node C. Finally, node B, which is the root, broadcasts a self-ID packet and self identification is complete.

The ID of each node is comprised within each self-ID packet. The ID of that node is the total number of self-ID packets that has received from other nodes up to that point at which that node broadcasts a self-ID packet. Taking the example shown in FIG. 3, no node has yet broadcast a self-ID packet at the point at which node A broadcasts, so the ID of node A becomes 0. Node A broadcasts a self-ID packet containing the ID of 0. When node D broadcasts, only node A has issued a self-ID packet. Therefore, the ID of node D becomes 1. In a similar manner, the IDs of nodes E, C, and B become 2, 3, and 4, respectively.

The format of a self-ID packet is shown in FIG. 4A. As shown in this figure, basic information on the nodes is comprised within the self-ID packets. More specifically, information such as the ID of each node (PHY_ID), whether or not the link layer is active (L), the gap-count (gap_cnt), the transfer speed (sp), whether or not the node has the capability of becoming an isochronous resource manager (C), the power state (pwr), and the port states (p0, p1, p2) is comprised therein.

Note that FIG. 4B shows the format of self-ID packets #1, #2, and #3 that are used when a node has 4 or more ports. If a node has between 4 and 11 ports, self-ID packets #0 (FIG. 4A) and #1 are used; if a node has between 12 and 19 ports, self-ID packets #0, #1, and #2 are used; and if a node has between 20 and 27 ports, self-ID packets #0, #1, #2, and #3 are used.

The formats of a link-on packet and a PHY configuration packet, which are physical-layer packets (PHY packets), are shown in FIGS. 4C and 4D, in a similar manner to the self-ID packets.

1.5 Isochronous Resource Manager

The isochronous resource manager (IRM) has the management functions described below.

First of all, it provides the various resources necessary for isochronous transfer. For example, it provides a channel number register and a bandwidth register. Secondly, it provides a register that indicates the ID of the bus manager. Thirdly, it assumes some bus management function if there is no other bus manager.

Of the nodes which have the capability of becoming the IRM (which are capable of managing isochronous resources) and which are also in an operational state (having an active link layer), i.e., of the nodes qualified to become the IRM, the node closest to the root (the node with the largest ID) becomes the IRM. More specifically, of the nodes having self-ID packets (see FIG. 4A) wherein the C (CONTENDER) bit indicating whether or not that node has IRM capability and the L (LINK_ACTIVE) bit indicating whether or not the link layer is active are both 1, the closest node to the root (the node with the largest PHY_ID) becomes the IRM. If the C bit and L bit of the self-ID packet of the root node are both 1, for example, the root node will become the IRM.

1.6 Cycle Master and Bus Manager

The cycle master has the role of issuing the cycle start packet shown in FIG. 1C, and the root node becomes the cycle master.

The bus manager performs tasks such as creating a topology map (the connection states of all the nodes), creating a speed map, managing power to the bus, determining the cycle master, and optimizing the gap count.

1.7 Protocol Configuration

Figure 5:
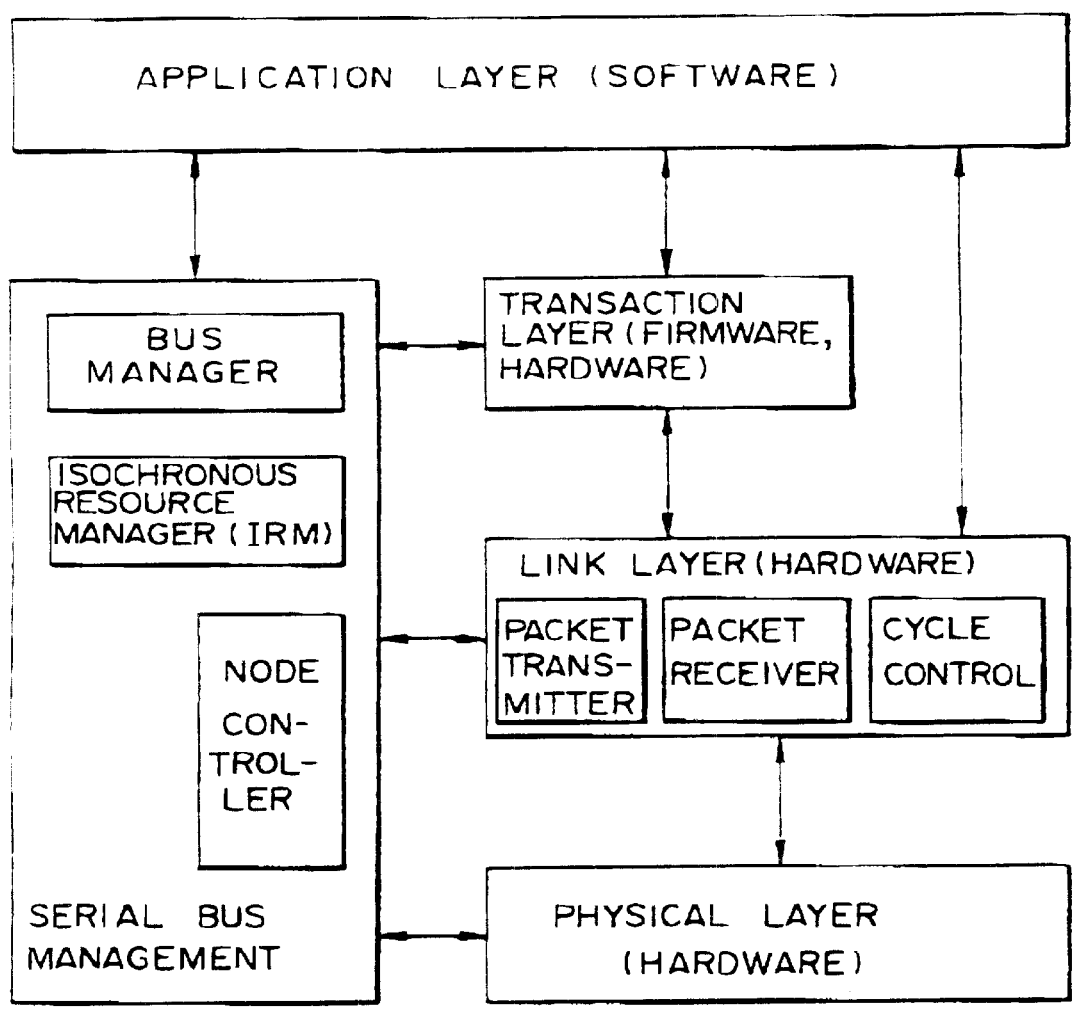
FIG. 5 is illustrative of the IEEE 1394 protocol configuration.

The description now turns to the protocol configuration (layer structure) of IEEE 1394, with reference to FIG. 5.

The IEEE 1394 protocol comprises a physical layer, a link layer, and a transaction layer. The serial bus management function monitors and controls the physical layer, link layer, and transaction layer, and provides various functions for controlling nodes and managing bus resources.

The physical layer converts the logical symbols used by the link layer into electrical signals, performs bus arbitration, and defines the physical bus interface.

The link layer provides functions such as addressing, data check, data framing, and cycle control.

The transaction layer defines the protocol for transactions such as read, write, and lock.

The physical layer and link layer are usually implemented by hardware such as a data transfer control device (interface chip). The transaction layer is implemented either by firmware operating on the CPU, or hardware.

2. Overall Configuration

The overall configuration of this embodiment is described below, with reference to FIG. 6.

Figure 6:
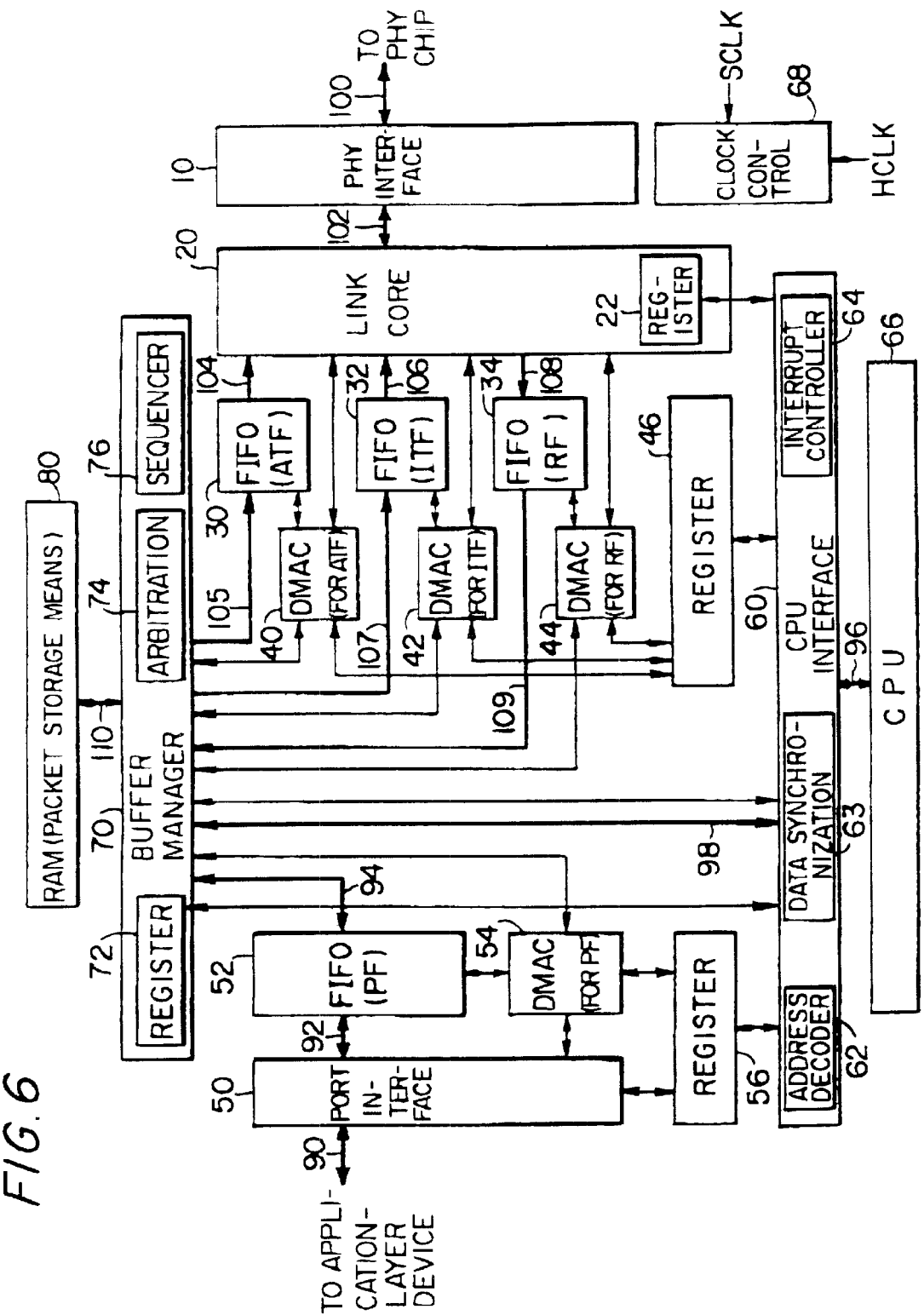
FIG. 6 shows a structural example of the data transfer control device of an embodiment of this invention.

In FIG. 6, a PHY interface 10 is a circuit that provides an interface with a PHY chip that implements the physical-layer protocol.

A link core 20 (link means) is a circuit that implements part of the link layer protocol and the transaction layer protocol; it provides various service relating to packet transfer between node. A register 22 is provided to control the link core 20 that implements these protocols.

A FIFO (ATF) 30, FIFO (ITF) 32, and FIFO (RF) 34 are FIFOs for asynchronous transmission, isochronous transmission, and reception, respectively, each configured of hardware means such as registers or semiconductor memory. In this embodiment of the invention, these FIFOs 30, 32, and 34 have an extremely small number of stages. For example, the number of stages per FIFO is preferably no more than three, and more preferably no more than two.

DMACS 40, 42, and 44 are DMA controllers for ATF, ITF, and RF, respectively. Use of these DMACs 40, 42, and 44 makes it possible to transfer data between a RAM 80 and the link core 20 without going through a CPU 66. Note that a register 46 provides control such as that over the DMACs 40, 42, and 44.

A port interface 50 is a circuit that provides an interface with application-layer devices A such as printer drivers, by way of example). In this embodiment of the invention, the use of this port interface 50 makes it possible to transfer 8-bit data transfer, for example.

A FIFO (PP) 52 is a FIFO used for transferring data between an application-layer device and a DMAC 54 is a DMA controller for PF. A register 56 provides-control over the port interface 50 and the DMAC 54.

A CPU interface 60 is a circuit that provides an interface with the CPU 66 that controls the data transfer control device. The CPU interface 60 comprises an address decoder 62, a data synchronization circuit 63, and an interrupt controller 64. A clock control circuit 68 controls the clock signals used by this embodiment, and an SCLK signal sent from the PHY chip and an HCLK that is a master clock is input thereto.

A buffer manager 70 is a circuit for managing the interface with the RAM 80. The buffer manager 70 comprises a register 72 for controlling the buffer manager, an arbitration circuit 74 that arbitrates the bus connection to the RAM 80, and a sequencer 76 that generates various control signals.

Figure 7:
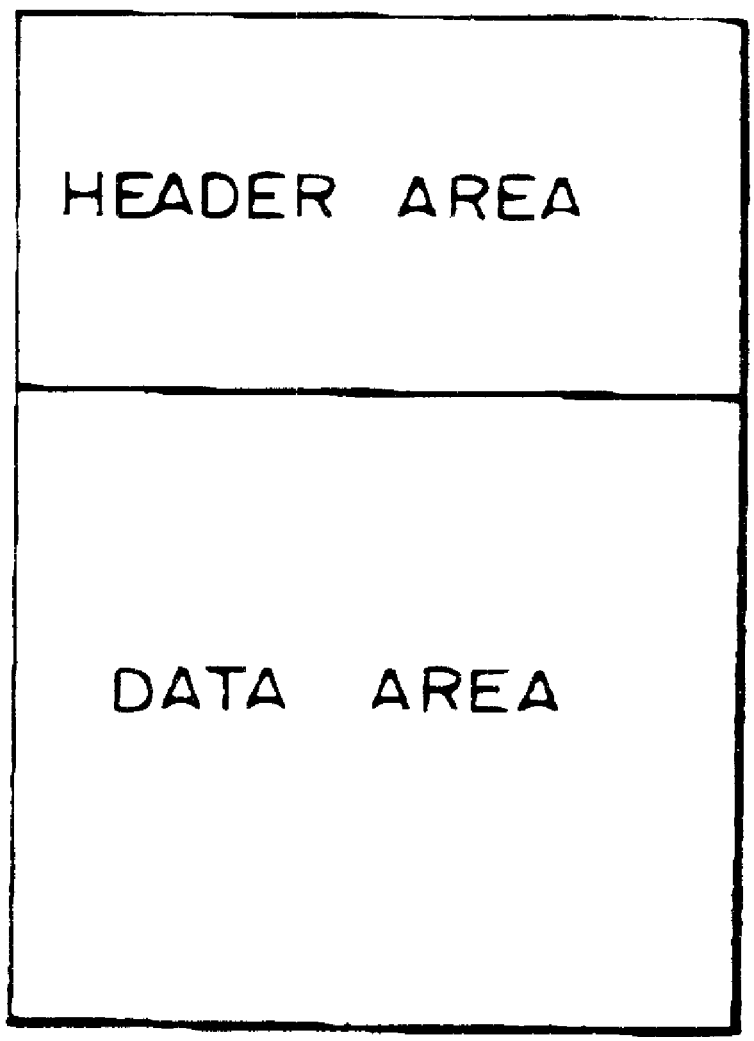
FIG. 7 is illustrative of the separation between the header (control information) area and the data area.

The RAM 80 functions as a randomly accessible packet storage means, where this function is implemented by SRAM or DRAM or the like. In this embodiment of the invention, the RAM 80 is divided into a header area (broadly speaking, a control information area) and a data area, as shown in FIG. 7. The header of a packet (broadly speaking, control information) is stored in the header area of FIG. 7, and the data of the packet is stored in the data area thereof.

Note that the RAM 80 is accommodated within the data transfer control device of this embodiment. However, it is possible to attach a part of the RAM 80 externally.

A bus 90 (or buses 92 and 94) is for connections to applications, as a first bus. Another bus 96 (or bus 98) is for controlling the data transfer control device, as a second bus, and is connected electrically to a device (such as a CPU) that controls the data transfer control device. Yet another bus 100 (orbuses 102, 104, 105, 106, 107, 108, and 109) is for electrical connections to physical-layer devices (such as the PHY chip), as a third bus. A further bus 110 (a fourth bus) is for electrical connections to RAM that acts as a randomly accessible storage means.

The arbitration circuit 74 in the buffer manager 70 arbitrates bus access requests from the DMAC 40, the DMAC 42, the DMAC 44, the CPU interface 60, and the DMAC 54. Based on the results of this arbitration, a data path is established between one of the buses 105, 107, 109, 98, and 94 and the bus 110 of the RAM 80 (i.e., a data path is established between one of the first, second, and third buses and the fourth bus).

One feature of this embodiment is the way in which it is provided with the RAM 80, which stored packets in a randomly accessible manner, and also the mutually independent buses 90, 96, and 100 as well as the arbitration circuit 74 for connecting one of those buses to the bus 110 of the RAM 80.

Figure 8:
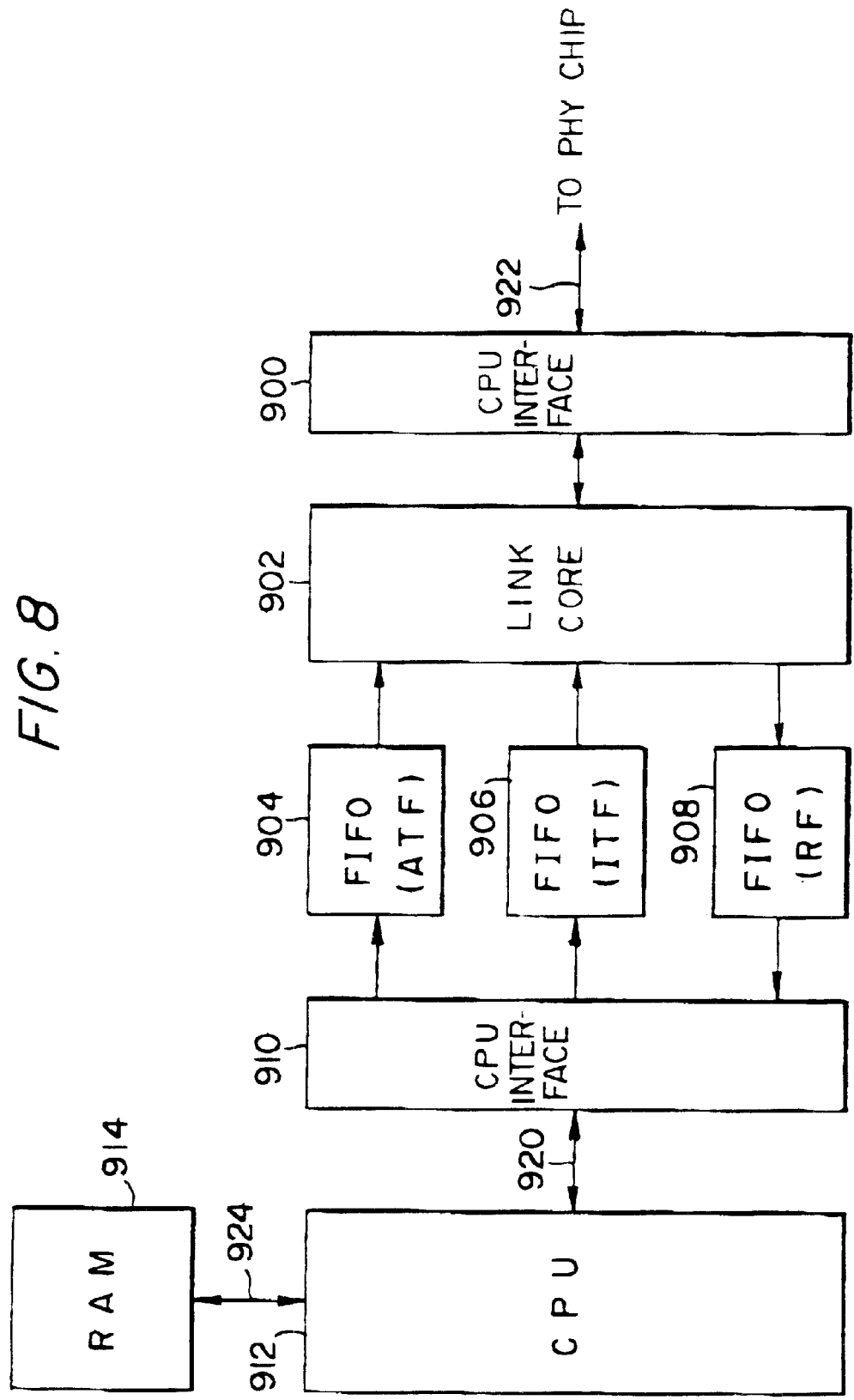
FIG. 8 shows the structure of a comparative example for this embodiment.

A data transfer control device that has a different configuration from that of this embodiment is shown in FIG. 8, by way of example. In this data transfer control device, a link core 902 is connected to a PHY chip by a PHY interface 900 and a bus 922. The link core 902 is connected to a CPU 912 by FIFOS 904, 906, and 908, a CPU interface 910, and a bus 920. The CPU 912 is also connected to a RAM 914, which is local memory of the CPU, by a bus 924.

Note that the FIFOs 904, 906, and 908 differ from the FIFOs 30, 32, and 34 of FIG. 6 in that they each have an extremely large number of stages (such as 16 stages per FIFO).

Figure 9:
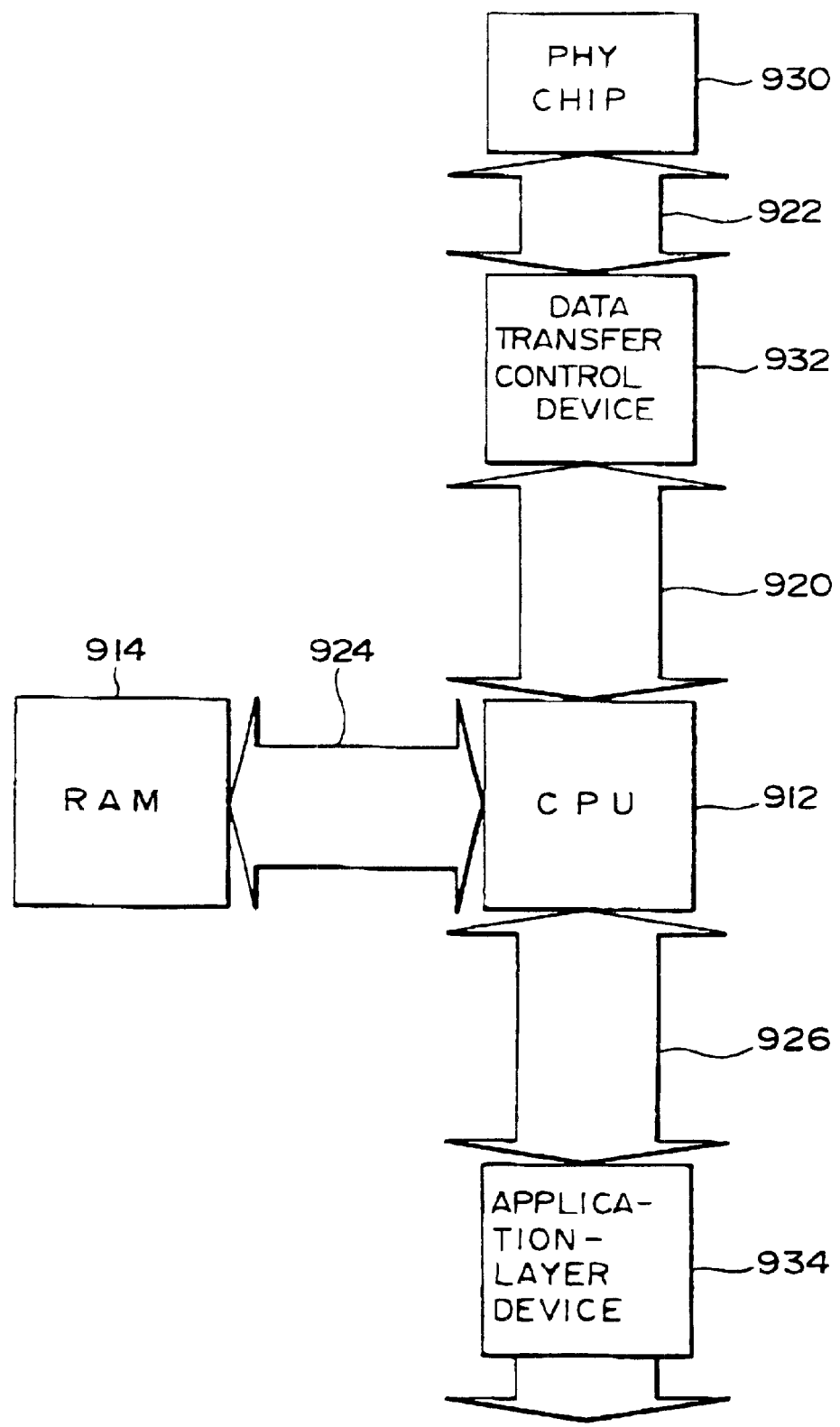
FIG. 9 is illustrative of the method of data transfer used by the configuration of FIG. 8.

The method of data transfer used with the data transfer control device configured as shown in FIG. 8 will now be described with reference to FIG. 9. A receive packet sent from another node through a PHY chip 930 passes through the bus 922, a data transfer control device 932,.and the bus 920, then is accepted by the CPU 912. The CPU 912 writes the accepted receive packet to the RAM 914 through the bus 924. The CPU 912 processes the receive packet into a form that can be used by the application layer, then transfers it to an application-layer device 934 through a bus 926.

When the application-layer device 934 transfers data, on the other hand, the CPU 912 writes this data to the RAM 914. A header is attached to the data in the RAM 914 to create a packet that conforms to IEEE 1394. The thus. created packet is sent to another node through the path comprising the data transfer control device 932 and the PHY chip 930.

However, if this data transfer method is employed, the processing load on the CPU 912 is extremely heavy. This means that, even if there is a fast transfer speed over the serial bus that connects nodes, the actual transfer speed of the entire system is slowed by factors such as processing overheads of the CPU 912, so that it is ultimately not possible to implement high-speed data transfer.

Figure 10:
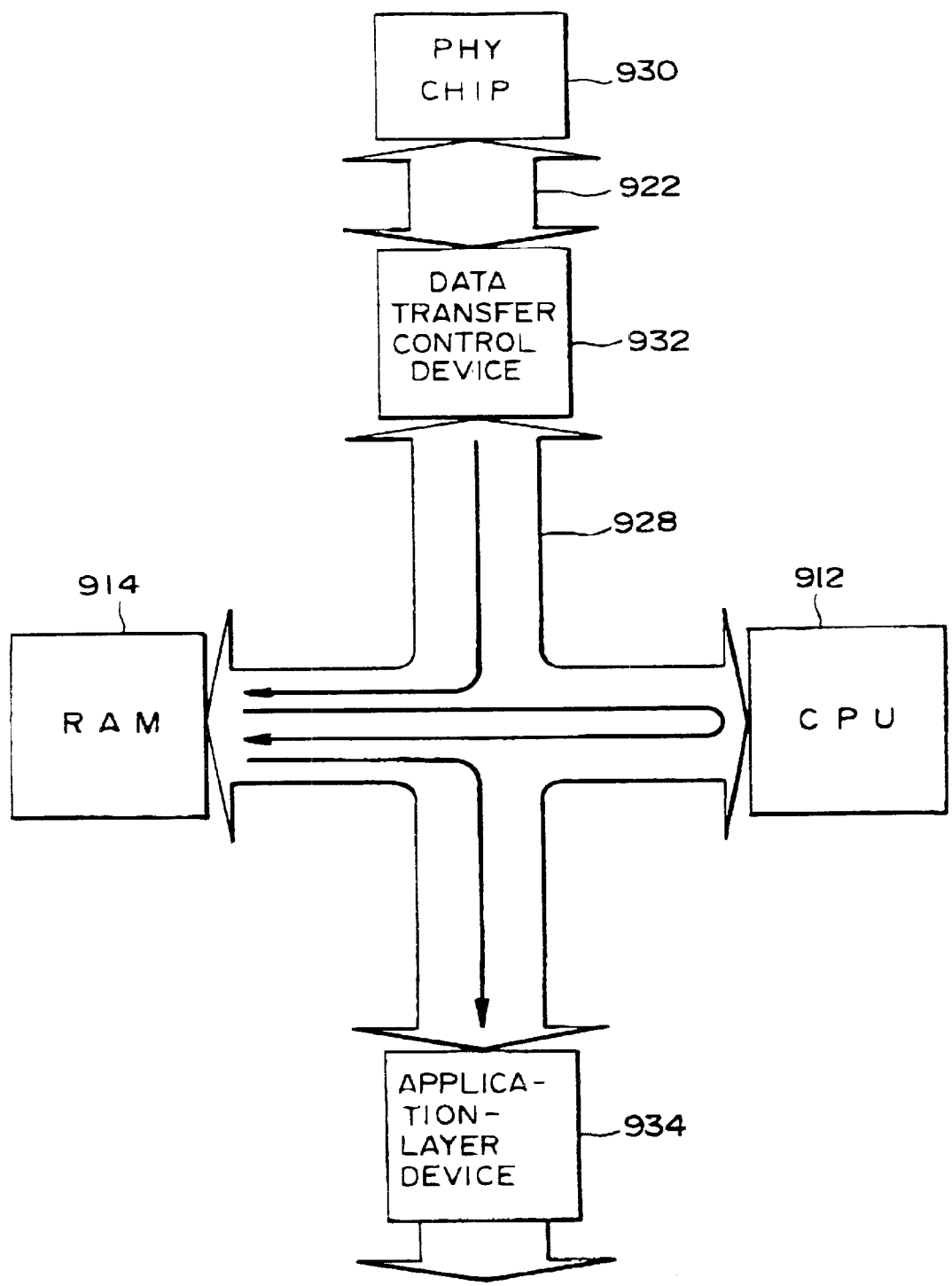
FIG. 10 is illustrative of another method of data transfer.

One method that can be considered for solving this problem uses hardware DMA to implement data transfer between the data transfer control device 932 and the RAM 914 and data transfer between the RAM 914 and the application-layer device 934, as shown in FIG. 10.

With this method, however, a CPU bus 928 has to be used for data transfers between the data transfer control device 932 and the RAM 914, between the RAM 914 and the CPU 912, and between the RAM 914 and the application-layer device 934. This means that if an attempt is made to increase the speed of data transfers within the entire system, a high-speed bus such as a PCI bus must be used as the CPU bus 928, leading to an increase in the cost of electronic equipment that uses this data transfer control device.

Figure 11:
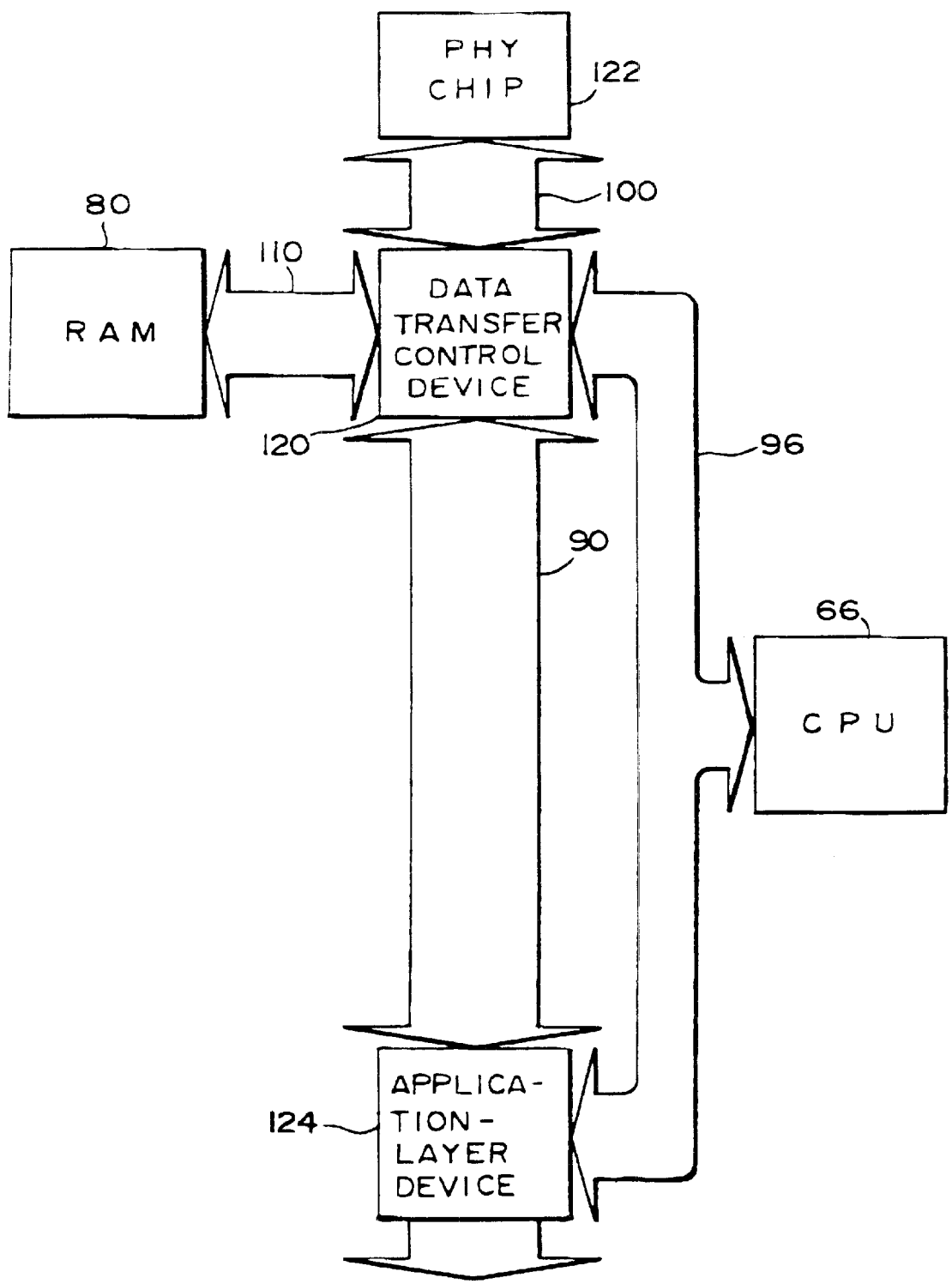
FIG. 11 is illustrative of the method of data transfer used by this embodiment of the invention.

In contrast thereto, this embodiment of the invention ensures that the bus 90 between a data transfer control device 120 and an application-layer device 124, the CPU bus 96, and the bus 110 between the data transfer control device 120 and the RAM 80 are mutually separated, as shown in FIG. 11. The configuration is therefore such that the CPU bus 96 can be used solely for controlling data transfer. In addition, the bus 90 is dedicated so that is can be used for data transfer between the data transfer control device 120 and the application-layer device 124. If, for example, the electronic equipment in which the data transfer control device 120 is incorporated is a printer, the bus 90 can be used exclusively for transferring print data. As a result, the processing load on the CPU 66 can be reduced and the actual transfer speed of the entire system can be increased. In addition, an inexpensive device can be employed as the CPU 66 and it is also no longer necessary to use a high-speed bus as the CPU bus 96. This ensures that the electronic equipment can be less expensive and more compact.

3. storage of Packets in Packet-Storage RAM 3.1 Features of this Embodiment

In the comparative example shown in FIG. 8, PIFOS 904 and 906 for transmission and a FIFO 908 for reception are provided between the link core 902 and the CPU 912.

In other words, receive packets that have been sent from another node are sequentially input to the FIFO 908 through the link core 902. The CPU 912 (or rather, firmware or application software running on the CPU) sequentially reads the receive packets from the FIFO 908 in the sequence in which they were input to the FIFO 908.

The CPU 912 sequentially inputs to the FIFOs 904 and 906 any send packets that are to be transferred. The send packets are sequentially transferred to another node through the link core 902, in the sequence in which they were input to the FIFOS 904 and 906.

Figure 12A:
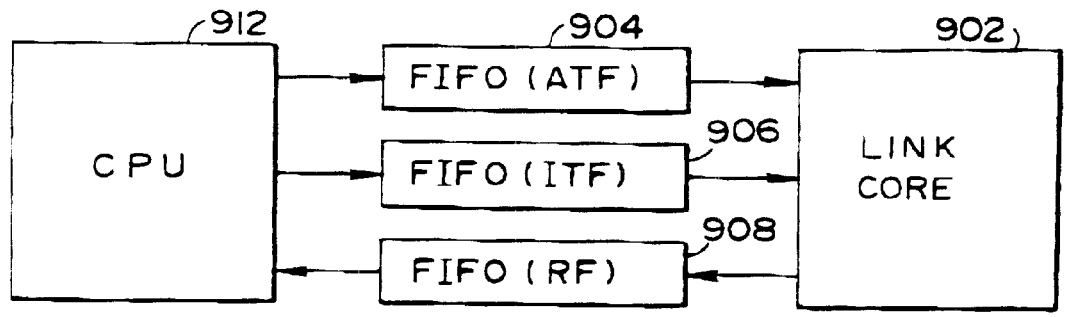
FIGS. 12A and 12B are illustrative of a method in which randomly accessible RAM is interposed between the link core and the CPU.
Figure 12B:
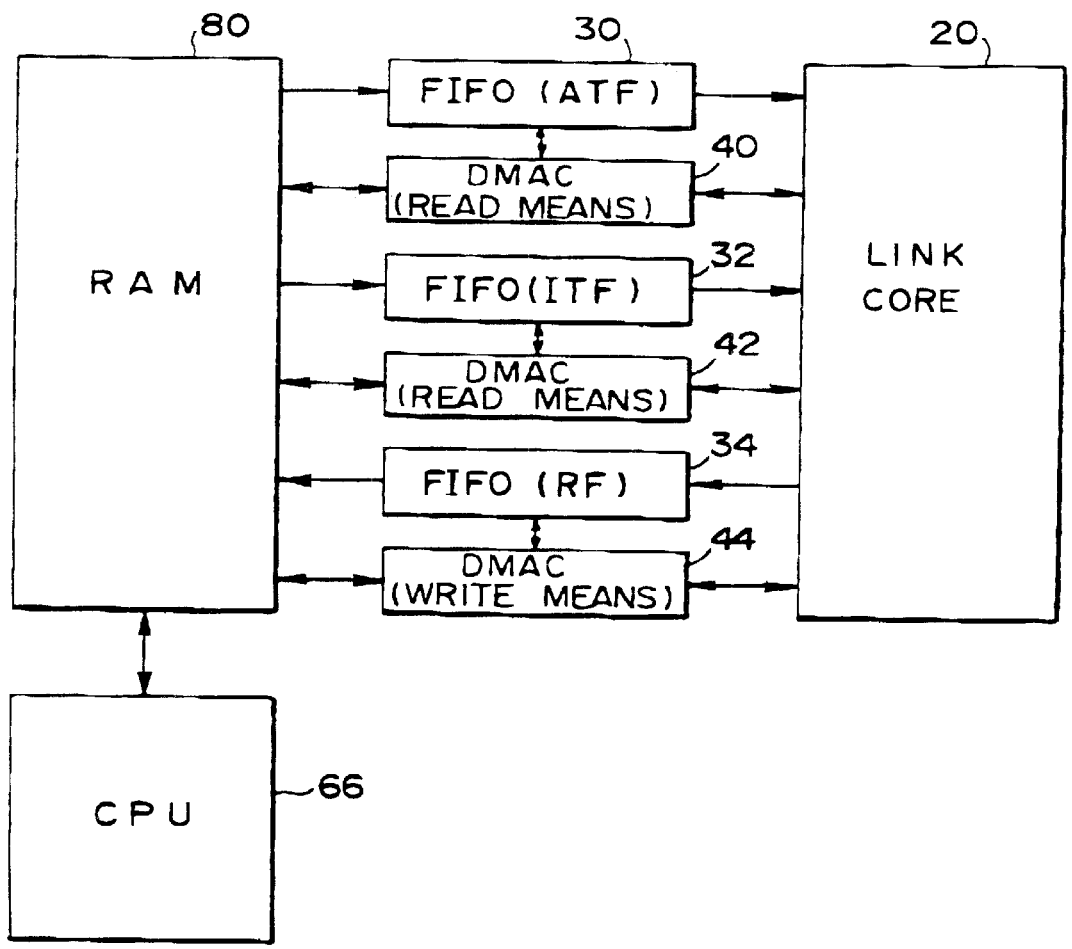

In contrast thereto, the RAM 80 is interposed within this embodiment between the link core 20, which provides various services for transferring packets between nodes, and the CPU 66, as shown in FIG. 12B, to function as a randomly accessible packet storage means in addition to the FIFOs 30, 32, and 34.

In other words, receive packets that are coming in from another node are stored in the FIFO 34 then are written to the RAM 80 by the DMAC 44 (write means). The CPU 66 reads the receive packets from this randomly accessible RAM 80.

The CPU 66 and other components writes to the RAM 80 any send packets that are to be transferred. The read-in send packets are read out by the DMACs 40 and 42 (read means), and are transferred to another node through the FIFOs 30 and 32 and the link core 20.

The CPU 912 of FIG. 12A has to accept receive packets from the FIFO 908 in the sequence in which they were received and store send packets in the FIFOS 904 and 906 in the sequence in which they will be sent. In contrast thereto, in this embodiment in which the randomly accessible RAM 80 is interposed between the link core 20 and the CPU 66, receive packets can be written to any addresses within the RAM 80, regardless of the sequence in which they were received. Similarly, the CPU 66 can write send packets to any addresses in the RAM 80, regardless of sequence in which they will be sent.

In addition, the FIFOs 904, 906, and 908 of FIG. 12A must have an extremely large number of stages. In contrast thereto, the number of stages in the FIFOs 30, 32, and 34 of this embodiment of the invention can be dramatically reduced, so that it is possible to have no more than three stages in each, by way of example.

Note that this embodiment of the invention could equally well be applied to a configuration in which the FIFOs 30, 32, and 34 are not provided.

In this embodiment, the storage area in the RAM 80 is divided into header area storing a packet header (broadly speaking, control information) and a data area storing packet data, as shown in FIG. 7. This can be implemented by interposing the randomly accessible RAM 80 between the link core 20 and the CPU 66, as shown in FIG. 12B.

In other words, the CPU 912 of FIG. 12A has to accept receive packets from the FIFO 908 in the sequence in which they were received. Therefore, if an attempt is made to separate the header and data of each receive packet, the CPU 912 first has to write the receive packet that has been read out from the FIFO 908 temporarily to RAM, which is local memory, then read the receive packet from that RAM in order to separate the header and the data. The CPU 912 of FIG. 12A also has to input send packets to the FIFOs 904 and 906 in the sequence in which they will be sent. If, for example, packet 1 (header 1, data 1), packet 2 (header 2, data 2), and packet 3 (header 3, data 3) are to be sent, the send packets must be input to the FIFOs 904 and 906 in the sequence: header 1, data 1, header 2, data 2, header 3, then data 3. This means that the CPU 912 has do to some rearrangement processing.

Thus the processing load on the CPU 912 of FIG. 12A is extremely large, which can lead to a deterioration in the actual transfer speed of the entire system as a result.

Figure 13:
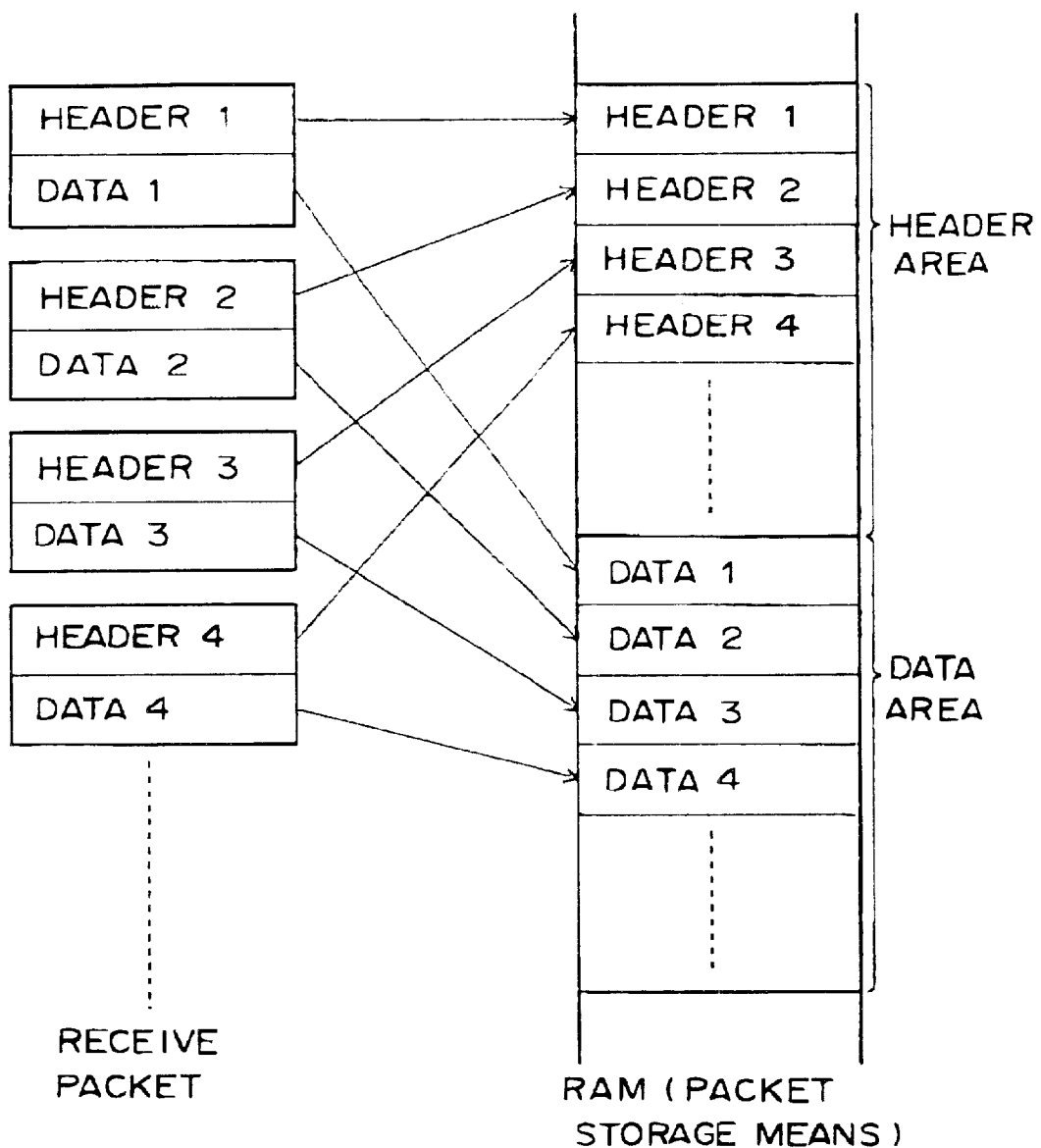
FIG. 13 is illustrative of a method in which the header and data of a receive packet are separated and are stored in a header area and data area in RAM.
Figure 14:
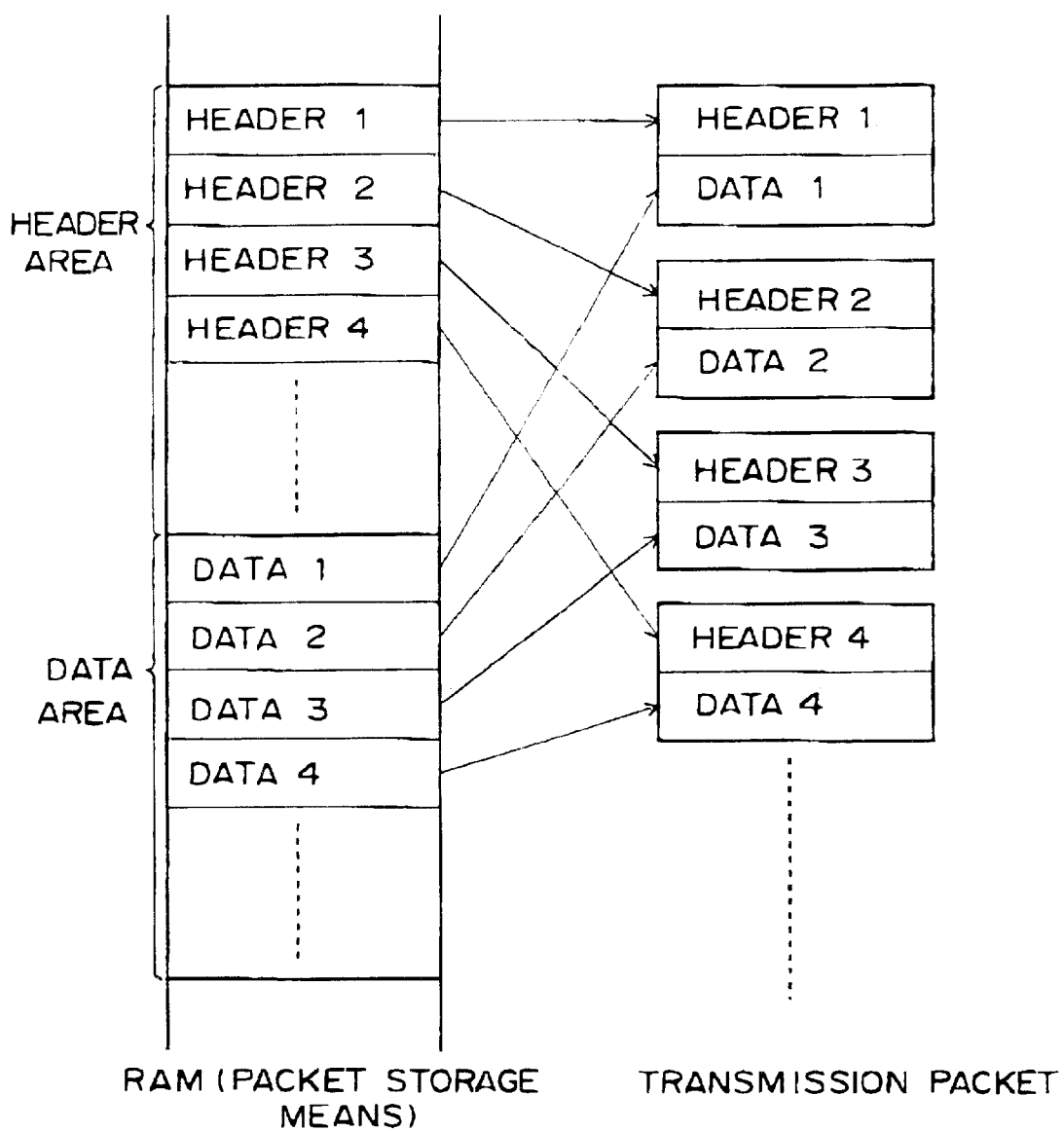
FIG. 14 is illustrative of a method in which a header stored in the header area is combined with data stored in the data area, to assemble a send packet.

In contrast thereto, the storage area of the RAM 80 in this embodiment of the invention is divided into a header area and a data area. More specifically, the header and data of each receive packet are divided by the hardware, with the header being stored in the header area and the data being stored in the data area, as shown in FIG. 13. Similarly, a header stored in the header area is combined by the hardware with data stored in the data area, to assemble a send packet to be transferred to another node, as shown in FIG. 14. This ensures that the processing load on the CPU 66 is extremely small in comparison with the configuration of FIG. 12A, which can improve the actual transfer speed of the entire system. In addition, since it is possible to employ an inexpensive device as the CPU 66 and it is also sufficient to use a low-speed bus for connection to the CPU 66, the data transfer control device and electronic equipment can be made more compact, at a lower cost.

With this embodiment of the invention, headers are stored together in the header area and data is stored together in the data area. It is therefore possible to simplify the read and write processing of headers and data, enabling a reduction in processing overheads. Taking data transfer by the method of FIG. 11 by way of example, the data transfer can be controlled by having the CPU 66 access only the header area through the CPU bus 96, to read and write headers. The application-layer device 124 can also read out the data continuously from the data area over the bus 90, and also write data continuously to the data area.

Figure 15:
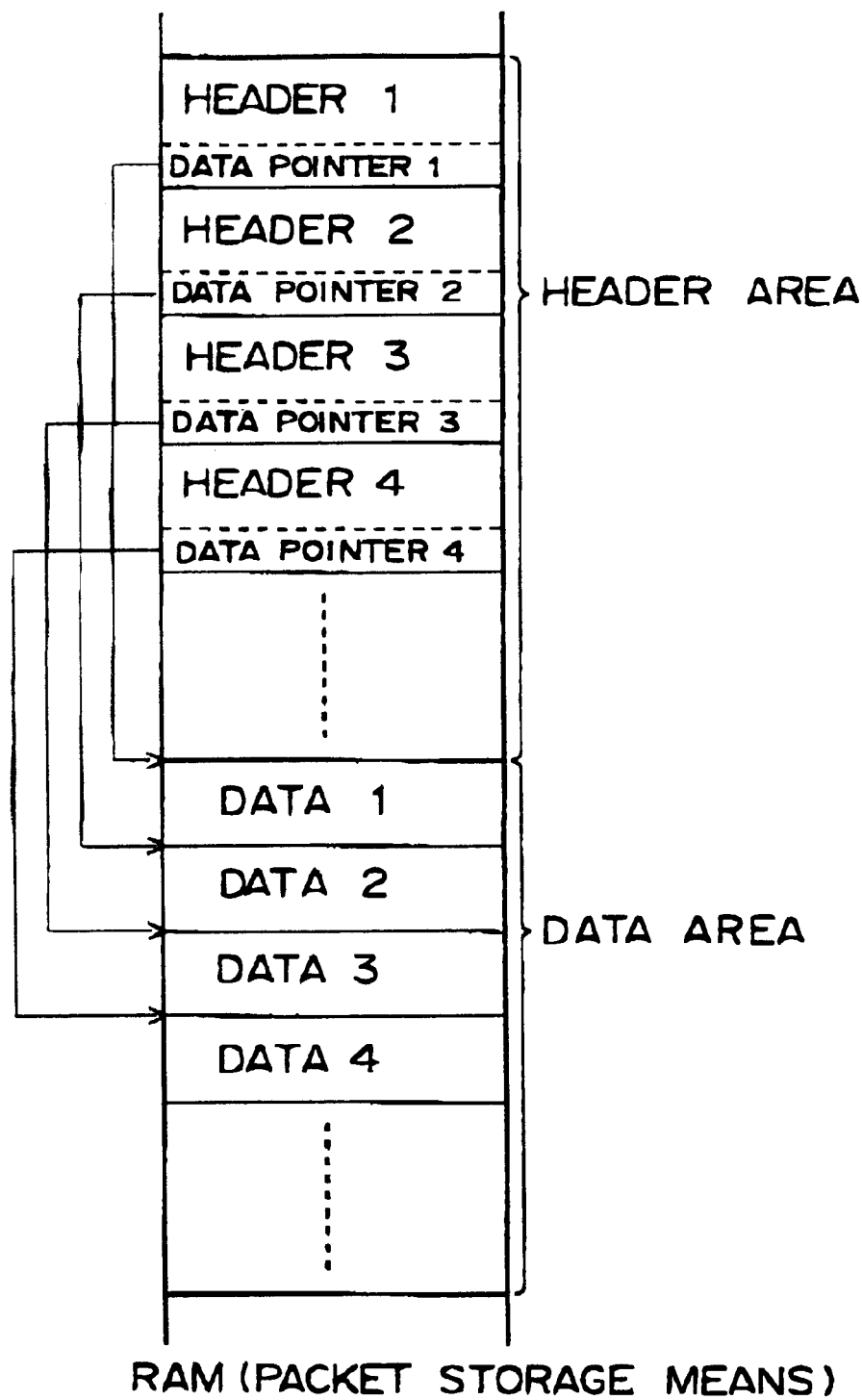
FIG. 15 is illustrative of a method in which a data pointer is comprised within a header stored in the header area.

Note that it is preferable to associate each header stored in the header area with the data stored in the data area by a data pointer comprised within the header, as shown in FIG. 15. In such a case, the configuration is such that the link core 20 attaches a data pointer to the header of each receive packet, for example, and the firmware attaches a data pointer to the header of each send packet, for example.

In this embodiment of the invention, the tags shown in FIG. 16 are created for delimiting (distinguishing) between the start (top of the header), header, data, and trailer of each receive packet, and these tags are linked to the receive packet. More specifically, when the link core 20 of FIG. 6 transfers the start, header, data, and trailer of a receive packet to the FIFO 34, it simultaneously transfers the 2-bit tags shown in FIG. 16 to the FIFO 34. In this embodiment, these tags that have been linked to each receive packet are used to separate the header and data of the receive packet and store them in the header area and the data area, respectively, as shown in FIG. 13. More specifically, the DMAC 44 of FIG. 6 uses the tags that are output from the FIFO 34 together with the receive packet, to separate the header and the data of the receive packet and write them to the RAM 80. Note that the tags can be anything that delimits (distinguishes) at least the header and the data.

An example of a method that separates the header and data of a receive packet, without using the tags, is a method that uses a tcode (transaction code) within each header. In this method, the tcode is decoded to check the size of the header, a portion of the receive packet correspond to that size is stored in the header area, and the remainder is stored in the data area.

However, this method necessitates a circuit for decoding the tcode, so the circuitry becomes larger.

If the tags are used instead, the DMAC 44 can separate the header and the data of a receive packet by simply looking at the tags. It is therefore possible to separate the header and data of each receive packet by a simple process, without increasing the size of the circuitry by much.

Figure 17A:
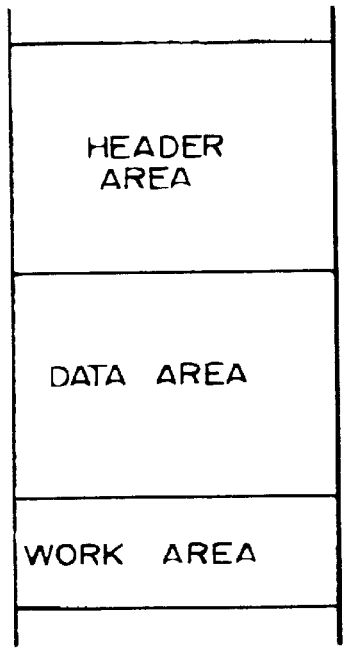
FIGS. 17A, 17B, 17C, 17D, 17E, and 17F are illustrative of methods of dividing the RAM into various different areas.

Other than the header area and the data area, a work area for the CPU 66 that is separated-from these areas is also provided in the RAM 80 of this embodiment, as shown in FIG. 17A. This makes it possible for the CPU 66 to access the work area directly, and this area can be used for the processing of the CPU 66. If the CPU 66 has local memory, therefore, it is possible to reduce the capacity of that memory. It is even possible to remove the necessity of providing local memory for the CPU 66 entirely. This ensures that the data transfer control device and electronic equipment can be made more compact and less expensive.

Figure 17B:
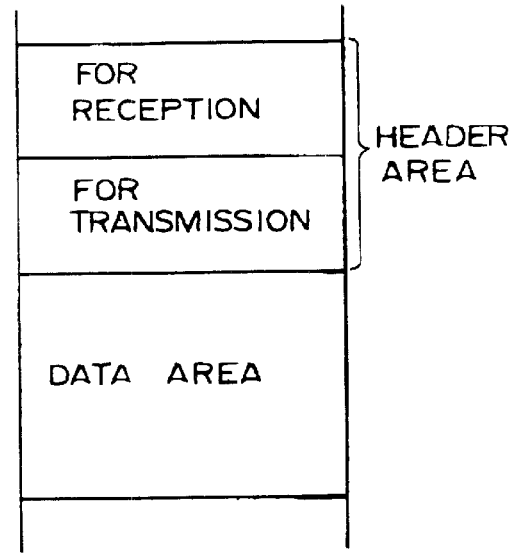

In this embodiment of the invention, the header area is divided (partitioned) into areas for reception and transmission, as shown in FIG. 17B. Each of these header areas for reception and transmission could be made capable of containing at least one packet.

Taking the configuration of FIG. 8 for example, the CPU 912 stores receive packets and send packets in the RAM 914 that is local memory. Thus the CPU 912 must store and manage the addresses at which the receive packets and send packets are stored, for each packet. This makes the processing performed by the CPU 912 more complex, increasing the processing load. In an application such as a CD-R drive in particular, which mixes reception processing and transmission processing, the receive packets and send packets are mixed together when stored in the RAM 914, which further aggravates the problems of more complex processing and increased processing load.

In contrast thereto, the header area in this embodiment of the invention is divided into areas for reception and transmission, as shown in FIG. 17B. The reception headers are therefore stored orderly in the header area for reception within the RAM 80 and the transmission headers are stored orderly in the header area for transmission. Therefore, the configuration could be arranged so that the CPU 66 accesses the header area for reception during reception processing and the header area for transmission during transmission processing. The configuration could also be such that, when a string of receive packets is received, the headers are read out sequentially from the header area for reception, and when a string of send packets are to be sent, the headers are written sequentially to the header area for transmission. The processing load on the CPU 66 is therefore greatly reduced, making it possible to expect an improvement in the actual transfer speed of the entire system.

Figure 17C:
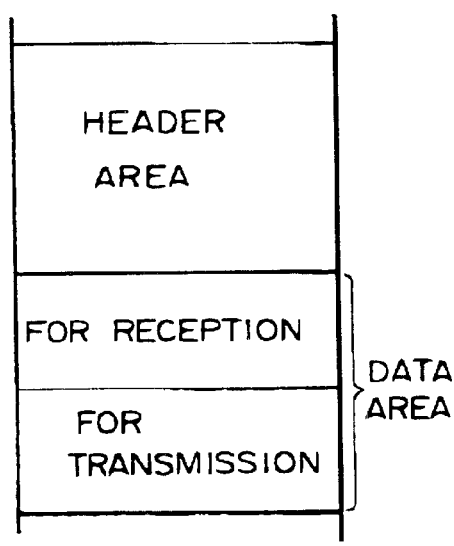

In addition, the data area of this embodiment can be divided into areas for reception and transmission, as shown in FIG. 17C.

This ensures that the application-layer device 124 of FIG. 11, for example, can read out receive data continuously from the data area for reception in the RAM 80, and also write send data continuously to the data area for transmission. Address control during read or write is also facilitated thereby, because it is sufficient to simply increment (or decrement) the addresses. As a result, this embodiment of the invention makes it possible to dramatically reduce the processing overheads and enable an improvement in actual transfer speed.

Figure 17D:
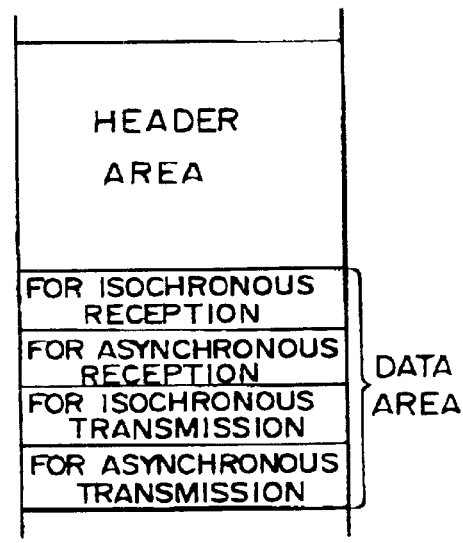

Furthermore, the data area of this embodiment can be divided into areas for isochronous transfers and asynchronous transfers. More specifically, the data area is divided into areas for isochronous reception, asynchronous reception, isochronous transmission, and asynchronous-transmission, as shown in FIG. 17D.

Taking the configuration of FIG. 8 as an example, a mixture of isochronous packets and asynchronous packets can be input to the FIFO 908. The CPU 912 then reads the packets out from the FIFO 908 in the sequence in which they were input. The packets are stored in the RAM 914, which is local memory, in the sequence in which they were read out. This means that the RAM 914 can store a mixture of isochronous packets and asynchronous packets.

The processing of isochronous packets demands real-time capabilities. This means that the CPU 912 must complete the processing related to isochronous packets within a fixed time. However, the CPU 912 of FIG. 8 has to read packets from the FIFO 908 in the sequence in which they were input to the FIFO 908, and the configuration is such that isochronous packets and asynchronous packets are mixed within the RAM 914. Therefore, if an isochronous packet is sent in after an asynchronous packet, the asynchronous packet has to be processed first and it is thus not possible to process the isochronous packet first. It is therefore possible that the processing of isochronous packets that requires real-time capabilities will be delayed.

In contrast thereto, this embodiment of the invention ensures that isochronous packets are stored in the area for isochronous transfers and asynchronous packets are stored in the area for asynchronous transfers. This makes it possible to read out isochronous packets first and process them first, even if an isochronous packet is sent in after an asynchronous packet As a result, the processing of isochronous packets can be completed within a fixed time, thus making it possible to maintain the real-time capabilities required for the processing of isochronous packets.

This division of the data area into areas for isochronous transfers and asynchronous transfers also makes it possible to simplify the processing performed by the application-layer device. Consider the case of a digital video camera, for example, wherein moving images which require real-time capabilities are transferred isochronously and static images which required reliability are transferred asynchronously. Assume that the bus 90 of FIG. 11 is used for transferring the data for moving images and static images directly between the data transfer control device 120 and the application-layer device 124. In such a case, the division of the data area into areas for isochronous transfers and asynchronous transfers can simplify the transfer of this data for moving images and static images. When data for moving images is transferred, all the data for the moving images is written together to the data area for isochronous transfers, and when data for static images is transferred, all the data for the static images is written together to the data area for asynchronous transfers. During this write process, address control is facilitated because it is sufficient to simply increment (or decrement) the addresses.

Figure 17E:
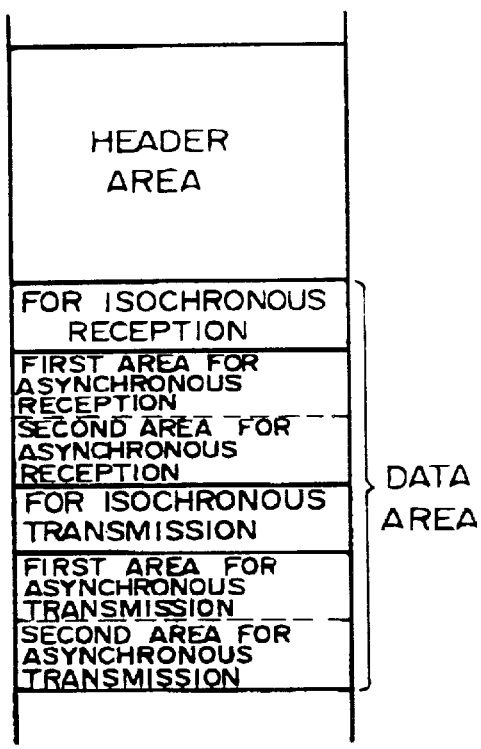

Even further, the data area for asynchronous transfer of this embodiment can be divided into a plurality of areas. More specifically, the area for asynchronous reception is divided into first and second areas for asynchronous reception, as shown in FIG. 17E. Similarly, the area for asynchronous transmission is divided into first and second areas for asynchronous transmission.

With an application such as a printer, for example, not only control-related data such as command data and status data, but also print data, is transferred asynchronously. If the data area for asynchronous transfer is not divided into a plurality of areas in such a case, the control-related data and print data will be mixed and stored within the data area for asynchronous transfer. This makes it impossible to maintain the continuity of the print data and increases the processing load on upper layers.

If the data area for asynchronous transfer is partitioned into a plurality of areas as shown in FIG. 17E, control-related data such as command data and status data can be stored in a first data area for asynchronous transfer, for example, and print data can be stored in a second data area for asynchronous transfer As a result, it is possible to store the print data continuously in the second data area for asynchronous transfer, enabling a reduction in the processing load on upper layers.

Figure 17F:
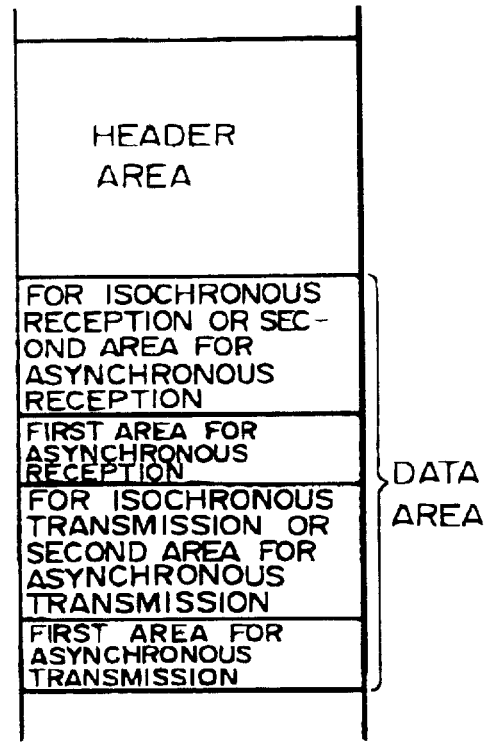

In this embodiment of the invention, the data area could also be divided into a data area for isochronous transfer and a first data area for asynchronous transfer, where the data area for isochronous transfer can also be used as a second data area for asynchronous transfer as required. More specifically, the area for isochronous reception can be used as a second area for asynchronous reception as required, and the area for isochronous transmission can be used as a second area for asynchronous transmission as required, as shown in FIG. 17F.

With an application such as a digital video, for example, image data (particularly moving image data) is transferred isochronously whereas control-related data such as command data and status data is transferred asynchronously. In such a case, the image data is therefore stored in the data area for isochronous transfer and the control-related data is stored in the first data area for asynchronous transfer.

With an application such as a printer, on the other hand, both the print data and the control-related data such as command data and status data are transferred asynchronously. In such a case, therefore, the data area for isochronous transfer can be used as a second data area for asynchronous transfer, as shown in FIG. 17F, and the print data can be stored in this second data area for asynchronous transfer. The control-related data, on the other hand, is stored in the first data area for asynchronous transfer.

In this manner, it is possible to utilize limited resources efficiently, by using the data area for isochronous transfer as a second data area for asynchronous transfer as required, depending on the application.

Figure 18:
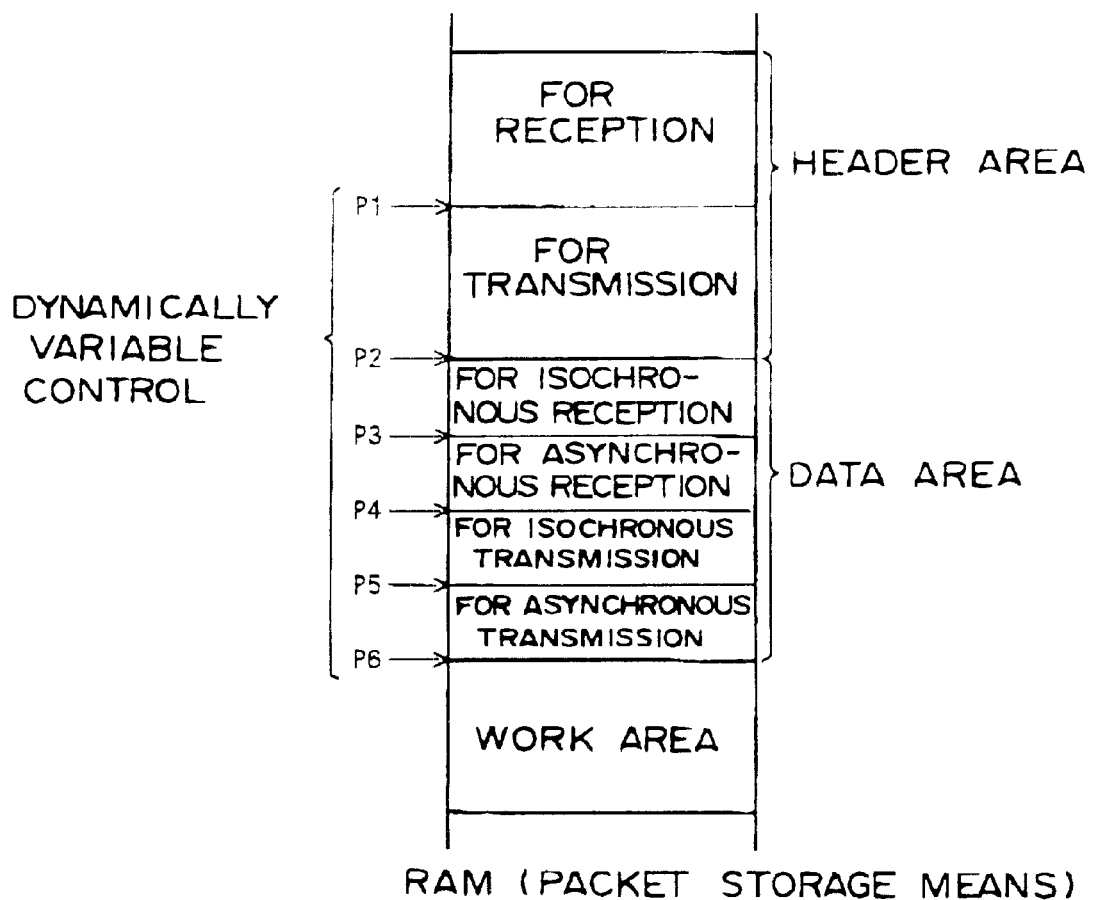
FIG. 18 is illustrative of a method of controlling the size of each area in RAM in a versatile manner.

If the RAM 80 is divided into a plurality of areas in this embodiment of the invention, the configuration could be such that the size of each area can be controlled variably. More specifically, pointers P1 to P6 that indicate the addresses of the boundaries of the areas can be controlled variably, as shown in FIG. 18.

This makes it possible to implement the optimal area partitioning for each application. With an application such as a printer, which sends few packets but receives many packets, for example, the size of the area for reception can be increased. Similarly, with an application such as a scanner, which receives few packets but sends many packets, the size of the area for transmission can be increased. With an application that performs many asynchronous transfers, the size of the area for asynchronous transfers can be increased, whereas with an application that performs many isochronous transfer, the size of the area for isochronous transfers can be increased.

Alternatively the area for isochronous transfers can be set to zero for an application that performs only asynchronous transfers. This makes it possible to efficiently utilize limited resources (such as the RAM 80 with its small storage capacity).

A method wherein the sizes of the FIFOs 904, 906, and 908 in the configuration of FIG. 8 can be varied raises a problem in that the hardware becomes complicated. In contrast thereto, the size of each area in the RAM 80 can be varied, only by controlling the addresses indicated by the pointers P1 to P6 (i.e., controlling the contents of the registers that contain the addresses of those pointers). This makes it possible to control the size of each area in a versatile manner, but with a simple hardware configuration.

Note that it is preferable that the size of each area in the RAM 80 can be controlled variably and dynamically after the power has been switched on. With an application such as a CD-R drive, for example, the processing is mainly reception processing when data is being written to a CD-R, but it is mainly transmission processing when data is being read from the CD-R. Therefore the pointers are dynamically switched in such a manner that the size of the area for reception is increased when writing data to the CD-R. Similarly, the pointers are dynamically switched in such a manner that the size of the area for transmission is increased when reading data from the CD-R. This makes it possible to utilize limited resources efficiently.

Figure 19A:
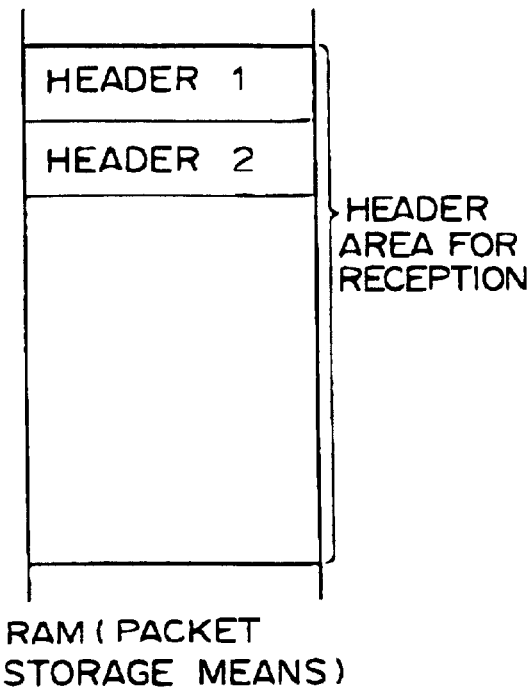
FIGS. 19A, 19B, and 19C are illustrative of ring buffer structures.
Figure 19B:
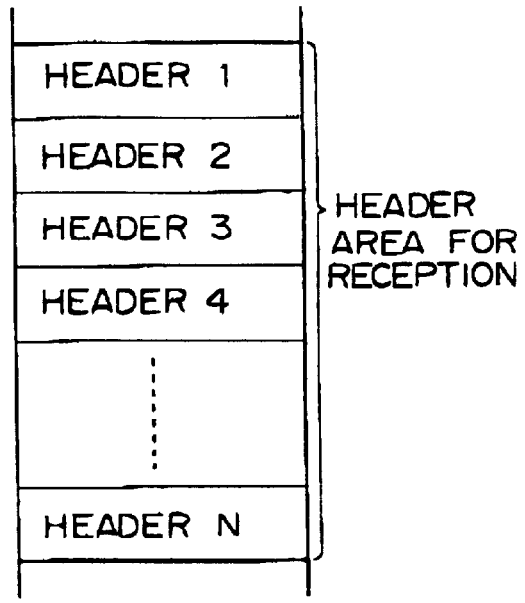
Figure 19C:
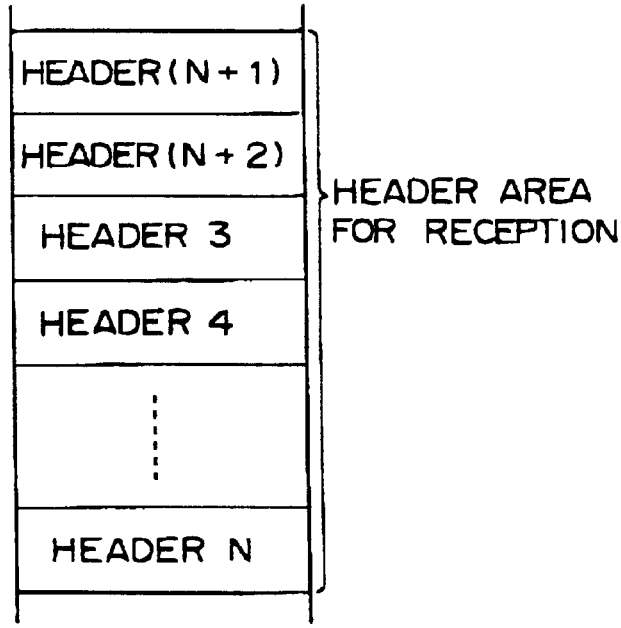

Note also that it is preferable that each of the areas divided by this embodiment has a ring buffer structure. Taking the header area for reception in the RAM 80 by way of example, the headers of packets are stored from one boundary (upper boundary) to the other boundary (lower boundary), as shown in FIG. 19A. When a storage point of header reaches other boundary, as shown in FIG. 19B, the storage point returns to the first boundary (the existing headers will be overwritten), as shown in FIG. 19C. Since headers are stored in the receive header area in the sequence in which they were received, this configuration ensures that the firmware and application software can discern in what sequence the packets were received. In other words, the useful features of FIFO storage can be obtained while using the randomly accessible RAM 80. In addition, this storage of packet headers from the first boundary after the second boundary has been reached ensures that limited resources (such as the RAM 80 with its small storage capacity) can be utilized efficiently.

It should be obvious that this ring buffer structure can also be used for the header area for transmission and the data area.

Figure 20A:
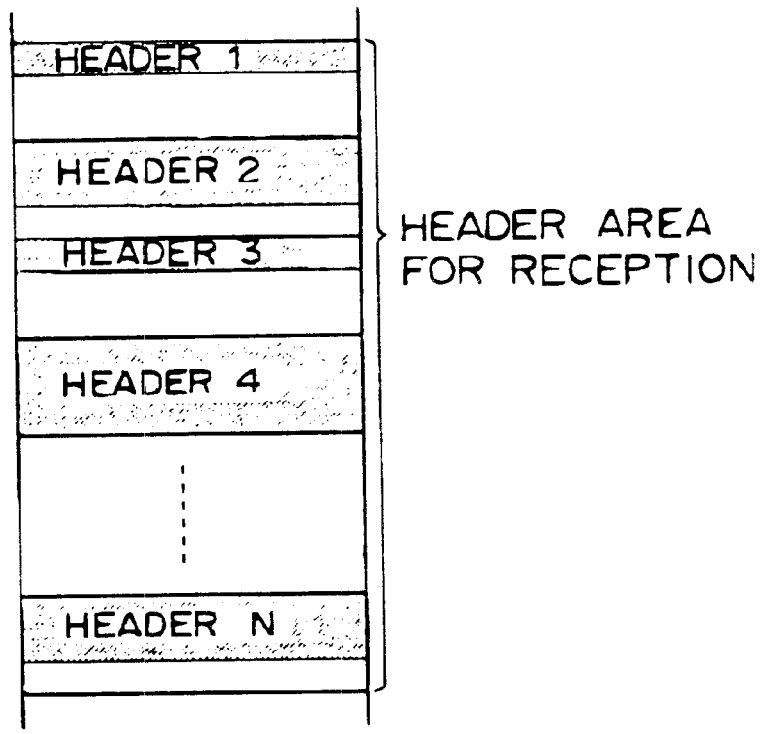
FIGS. 20A and 20B are illustrative of a method of fixing the size of an area in which the header or data of one packet is stored.
Figure 20B:
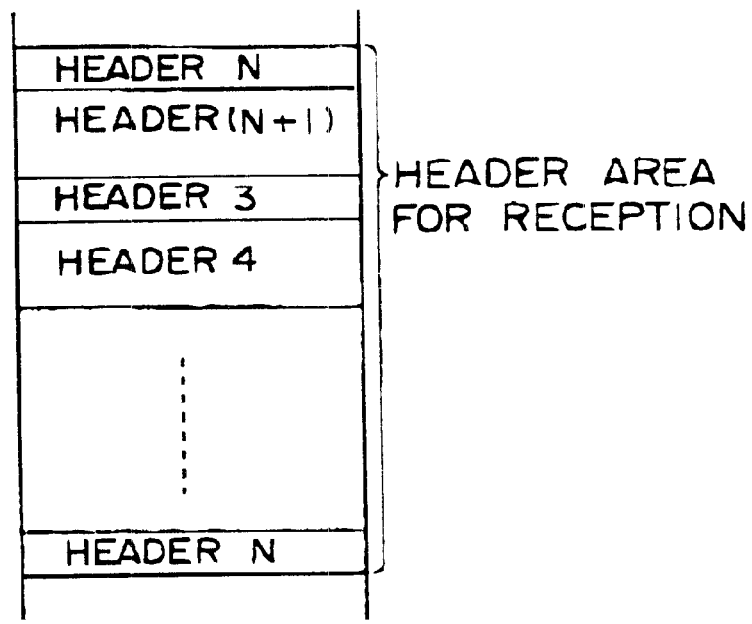

Note further that it is preferable with this embodiment of the invention that the size of the area in which the header (broadly speaking, control information) and data of one packet is stored (hereinafter called "storage area") is fixed, regardless of the sizes of the header and data of the packet. In the example shown in FIG. 20A, the sizes of the headers are all different, but the size of the storage areas therefore is fixed. In this case, the size of each storage area is in 8-quadlet units, by way of example, regardless of the sizes of the packet headers. This makes it possible to simplify address control in the firmware, enabling a reduction in processing overheads. In particular, if the size of the storage areas is not fixed when the ring buffer structure shown in FIGS. 19A, 19B, and 19C is employed, the header N could be stored in separate locations at the top and bottom of the area, as shown in FIG. 20B. This would lead to an increase in the processing load on the firmware. If the size of each storage area is fixed, this problem can be solved.

3.2 Reception-Side Configuration

Figure 21:
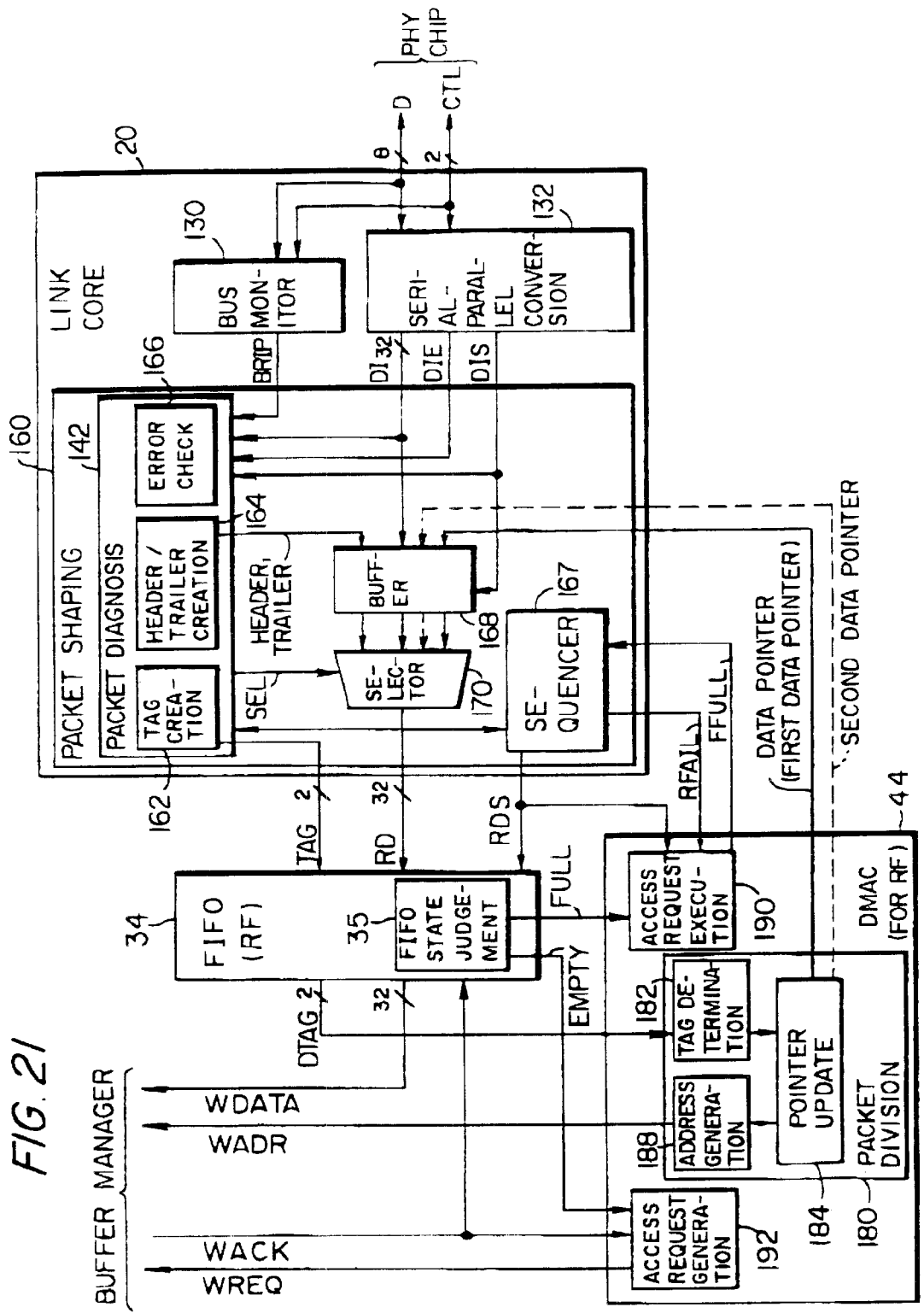
FIG. 21 shows an example of the configuration of the reception side.

The configuration on the reception side is described below. A detailed example of the configuration of the link core 20, the FIFO 34, and the DMAC 44 is shown in FIG. 21.

The link core 20 comprises a bus monitor circuit 130, a serial-parallel conversion circuit 132, and a packet shaping circuit 160. The packet shaping circuit 160 comprises a packet diagnosis circuit 142, a sequencer 167, a buffer 168, and a selector 170; and the packet diagnosis circuit 142 comprises a tag creation circuit 162, a header/trailer creation circuit 164, and an error check circuit 166.

The bus monitor circuit 130 monitors the 8-bit data bus D and the 2-bit control bus CTL that are connected to the PHY chip by the PHY interface 10.

The serial-parallel conversion circuit 132 converts the data on the data bus D into 32-bit data. For example, if the transfer speed is 400 Mbps, 8-bit-data is converted into 32-bit data; if the transfer speed is 200 Mbps, 4-bit data is converted into 32-bit data; and if the transfer speed is 100 Mbps, 2-bit data is converted into 32-bit data.

The packet diagnosis circuit 142 is a circuit that diagnoses packets. The TAG creation circuit 162 creates tags for delimiting the header, data, trailer, etc., the header/trailer creation circuit 164 creates headers and trailers (footers). The error check circuit 166 investigates error check information, such as parity, comprised within each packet, to detect errors.

The sequencer 167 creates various control signals. The buffer 168 and the selector 170 select one of DI from the serial-parallel conversion circuit 132, a header and trailer from the packet diagnosis circuit 142, or data pointers from the DMAC 44, using a SEL signal from the packet diagnosis circuit 142.

The FIFO 34 functions as a buffer for adjusting the phase of RD (which is output data from the link core 20) and WDATA (which is data to be written to the RAM 80), and it comprises a FIFO state judgement circuit 35. The FIFO state judgement circuit 35 makes an EMPTY signal go active when the FIFO is empty and a FULL signal go active when the FIFO is full.

The DMAC 44 comprises a packet division (separation) circuit 180, an access request execution circuit 190, and an access request generation circuit 192.

The packet division circuit 180 is a circuit that divides packets that have been shaped by the packet shaping circuit 160, then writes the headers and trailers to the header area of the RAM 80 and the data to the data area thereof (see FIG. 13). The packet division circuit 180 comprises a tag determination circuit 182, a pointer update circuit 184, and an address generation circuit 188.

The tag determination circuit 182 identifies the tags (DTAG) created by the TAG creation circuit 162.

The pointer update circuit 184 receives an output from the tag determination circuit 182 and updates the header pointer and data pointer, for writing the header and data to the RAM 80.

The address generation circuit 188 receives an output from the pointer update circuit 184 and issues a write address WADR to the RAM 80.

The access request execution circuit 190 executes access requests from the link core 20. When the FULL signal from the FIFO state judgement circuit 35 is active, the access request execution circuit 190 makes a FFULL signal go active. The sequencer 167 within the packet shaping circuit 160 makes RDS, which is a RD (RxData) strobe signal, go active on condition that FFULL is not active.

Note that RFAIL is a signal used by the sequencer 167 to inform the access request execution circuit 190 that a reception has failed.

The access request generation circuit 192 issues an access request to the RAM 80. The access request generation circuit 192 receives WACK (which is a write acknowledgment from the buffer manager 70) and EMPTY from the FIFO state judgement circuit 35, and outputs WREQ (which is a write request) to the buffer manager 70.

3.3 Reception-Side Operation

Figure 22:
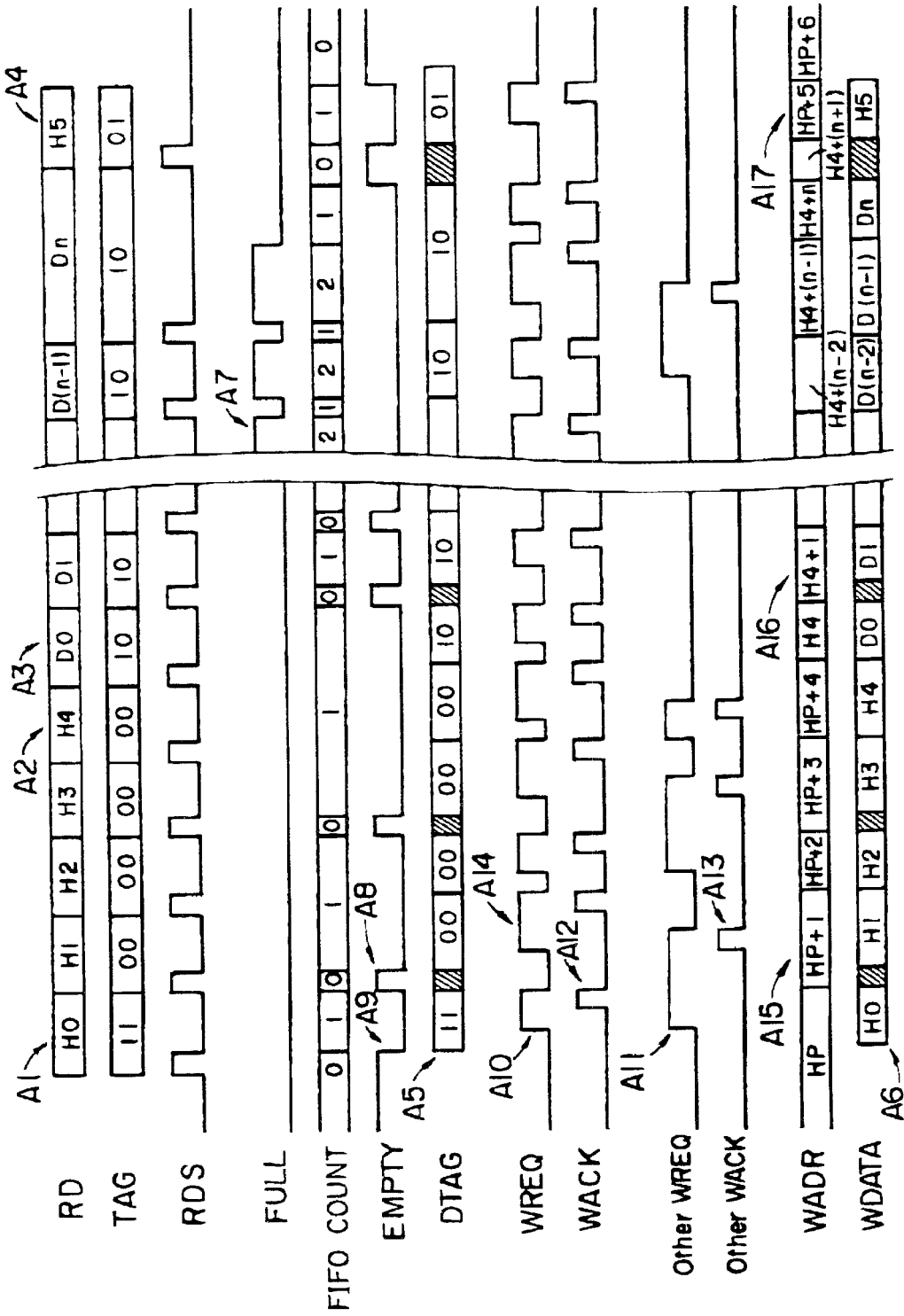
FIG. 22 is a timing waveform chart illustrating the operation of the reception side.

The operation of the reception side will now be described with reference to the timing waveform chart of FIG. 22.

The description first concerns the operation of the link core 20.

When a packet is received from another node through the PHY chip, the packet diagnosis circuit 142 diagnoses that packet The header/trailer creation circuit 164 then creates (shapes) a header. This header is input to the selector 170 through the buffer 168 and the selector 170 selects that header on the basis of the SEL signal from the packet diagnosis circuit 142. This ensures that the header (H0 to H4) is output to the FIFO 34 as RD, as shown at A1 in FIG. 22.

Figures 23A, 23B:
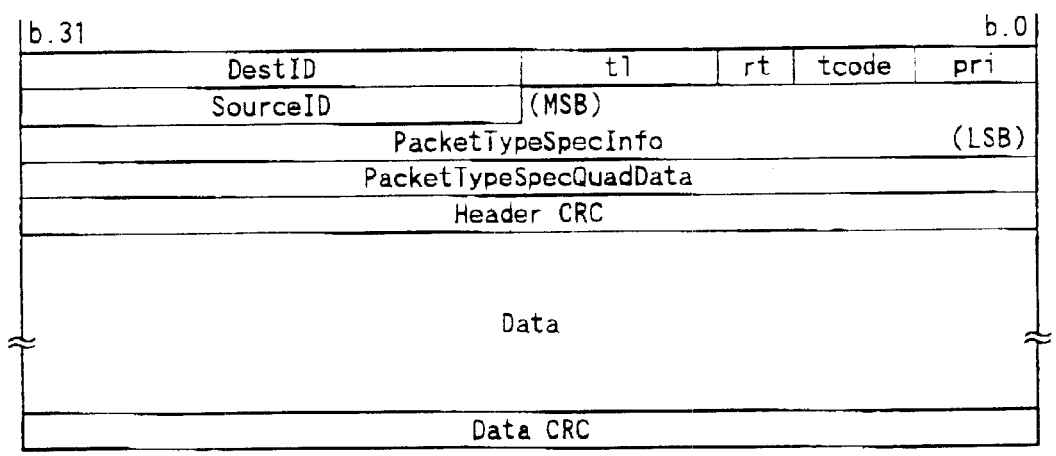
FIG. 23A shows the format of an asynchronous packet in accordance with the IEEE 1394 standard and FIG. 23B shows the format of the header portion of an asynchronous receive packet stored in the header area of RAM.

Note that the format of an asynchronous packet transferred over the serial bus (the IEEE 1394 standard) is shown in FIG. 23A. The format of the header portion of the asynchronous receive packet stored in the header area of the RAM 80 is shown in FIG. 23B (the hatched portion in this figure represents the trailer). In the embodiment as configured above, a packet in the format of FIG. 23A is shaped into a packet of the format of FIG. 23B, to ensure that it can be used by upper layers such as firmware.

With this embodiment of the invention, the fourth quadlet H4 of the header (at A2 in FIG. 22) becomes a data pointer for taking in data from the data area, as shown in FIG. 23B. This data pointer (H4) is input from the DMAC 44 (the pointer update circuit 184) to the selector 170 through the buffer 168, and the selector 170 selects it. In this manner, the packet shaping circuit 160 accepts the data pointer from the DMAC 44 and this data pointer is embedded in the header that is written to the RAM 80.

The data portion of the packet is then sent from PHY chip through the data bus D. The serial-parallel conversion circuit 132 converts this data portion into DI, which is 32-bit data, and outputs it to the packet diagnosis circuit 142 and the buffer 168.

Note that DIE is a signal indicating whether DI is enabled or disabled and DIS is a signal for determining the timing to take in DI.

The DI signal from the serial-parallel conversion circuit 132 is input to the selector 170 through the buffer 168, and the selector 170 selects it. This causes data DO to Dn to be output to the FIFO 34 as RD, as shown at A3.

A trailer from the header/trailer creation circuit 164 is then input to the selector 170 through the buffer 168, and the selector 170 selects it. This causes the trailer (H5, the portion shown hatched in FIG. 23B) to be output to the FIFO 34 as RD, as shown at A4.

The TAG creation circuit 162 creates tags for delimiting the information that is being output as RD. In this embodiment of the invention, each tag has two bits, as shown in FIG. 16, where (00) (01), (10), and (11) indicate header, trailer, data, and start (top of the header), respectively. Therefore, the tags shown in FIG. 22 by way of example change in the sequence: (11), (00), . . . , (10), . . . , (01). The configuration is such that 34-bit data consisting of these 2-bit tags and the 32-bit RD are input to the FIFO 34.

The description now turns to the operation of the FIFO 34.

The FIFO 34 receives tags and RD from the link core 20, and outputs them as DTAG and WDATA, as shown at A5 and A6.

The FIFO state judgement circuit 35 within the FIFO 34 uses an internal counter to count the number of data items (FIFO count) in the FIFO 34. When the FIFO 34 becomes full (when the number of data items is 2), FULL goes active (high) as shown at A7 in FIG. 22. When the FIFO 34 becomes empty (when the number of data items is 0), EMPTY becomes active as shown at A8. The fact that the FIFO 34 is full is conveyed by FULL and FFULL to the access request execution circuit 190 within the DMAC 44 and the sequencer 167 within the link core 20. The fact that the FIFO 34 is empty is conveyed by EMPTY to the access request generation circuit 192 within the DMAC 44.

The description now turns to the operation of the DMAC 44.

The access request generation circuit 192 makes WREQ go active, as shown at A10, on condition that EMPTY is inactive (low) as shown at A9 (indicating that the FIFO 34 is not empty). If WACK is accepted from the buffer manager 70, WREQ goes inactive.

In this embodiment of the invention, access requests from the DMAC 44 have the highest priority during bus arbitration for reception. Therefore, if there is a conflict between WREQ from the DMAC 44 and another WREQ from the CPU interface 60 and the DMAC 54 for ports, as shown at A10 and A11, WREQ has priority. In other words, WACK goes active before the Other WACK, as shown at A12 and A13. The reason why WREQ is given priority in this manner, when there is a conflict between WREQ and Other WREQ, is discussed below. Under IEEE 1394, packets from other nodes are transferred occur in succession, synchronized with the transfer clock, unlike with SCSI and other such standards. It is therefore necessary to give the transferred packets priority and store them in the RAM 80 in succession, without pausing.

With this embodiment of the invention, an access request from the DMAC 44 is made to wait only for a given time between the acceptance of access requests from the CPU interface 60 and the DMAC 54 for ports, as shown in A14. This means that RD from the link core 20 and WDATA to the buffer manager 70 are not synchronized. For that reason, this embodiment of the invention is provided with the FIFO 34 for adjusting the phases of RD and WDATA. In this case, the FIFO 34 could be provided with the minimum number of stages necessary for phase adjustment (preferably no more than three stages; more preferably no more than two stages).

The tag determination circuit 182 comprised within the packet division circuit 180 determines each DTAG that is output from the FIFO 34 together with WDATA, to identify whether WDATA refers to the start (top of the header), header, data, or trailer. The pointer update circuit 184 updates the header pointer and the data pointer based on this result. The address generation circuit 188 then generates WADR (the write address for WDATA) based on the updated header pointer and data pointer.

Figure 24A:
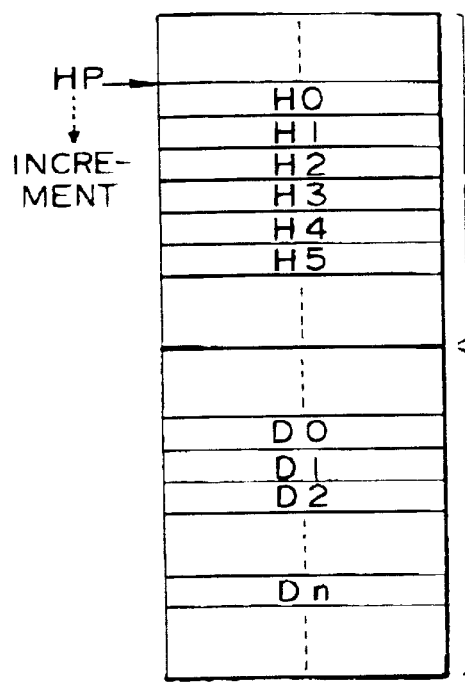
FIGS. 24A, 24B, 24C, and 24D are illustrative of the updating of the header pointer and data pointer.

More specifically, if it is determined from the DTAG that WDATA is the start or the header, for example, the pointer update circuit 184 increments (broadly speaking, updates) the header pointer HP, as shown in FIG. 24A. The address generation circuit 188 issues WADR in accordance with the thus incremented header pointer, as shown at A15 in FIG. 22.

Figure 24B:
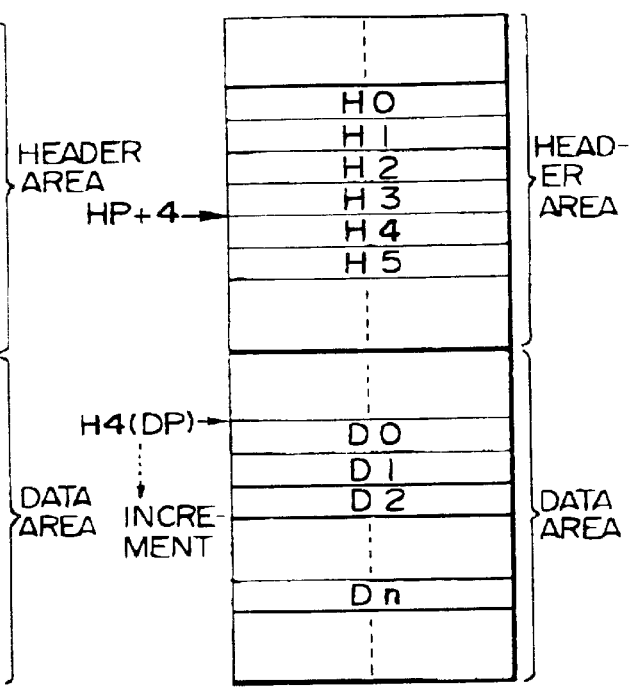

If it has been determined from the DTAG that WDATA is data, the pointer update circuit 184 increments the data pointer DP, as shown in FIG. 24B. This data pointer DP is equivalent to H4 which has been embedded in the fourth quadlet of the header by the packet shaping circuit 160. The address generation circuit 188 issues WADR in accordance with the thus incremented data pointer, as shown at A16 in FIG. 22.

Figure 24C:
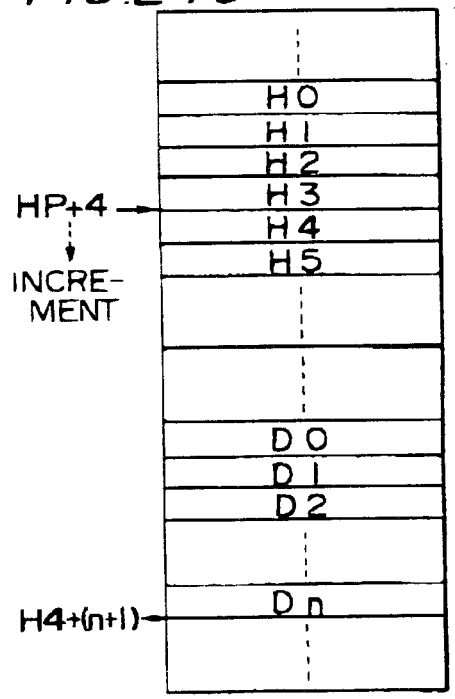

If it has been determined from the DTAG that WDATA is a trailer, the pointer update circuit 184 increments the header pointer, as shown in FIG. 24C. The address generation circuit 188 issues WADR in accordance with the thus incremented header pointer, as shown at A17 in FIG. 22.

Figure 24D:
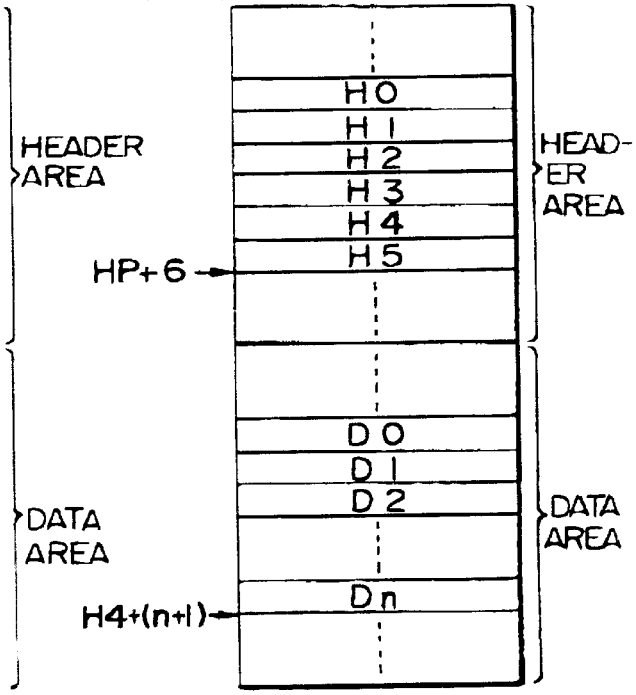

Note that the header pointer eventually ends up indicating the lower boundary (the upper boundary of the header portion of the next packet) of the header portion of the packet that has been processed, as shown in FIG. 24D. The data pointer is set to indicate the lower boundary (the upper boundary of the data portion of the next packet) of the data portion of the packet. The final positions of the header pointer and data pointer are restored to a header pointer setting register and a data pointer setting register within the register 46 of FIG. 6, on condition is that the reception did not fail (RFAIL is inactive).

As described above, it is possible to divide the packet and write the contents to the header area and data area.

In particular, this embodiment conveys the data pointer that is to be attached to the header, from the pointer update circuit 184 to the packet shaping circuit 160. The packet shaping circuit 160 attaches the thus-conveyed data pointer to the header of the packet. The configuration makes it possible for firmware, which has read a header from the header area, to obtain the storage address within the data area of the data that corresponds to that header, in a simple manner. The attachment of the data pointer is done by the packet shaping circuit 160, so it is not necessary for the DMAC 44 to participate therein. This means that the DMAC 44 can concentrate on writing data to the RAM 80, enabling a simplification of the circuit configuration and processing of the DMAC 44.

Note that the settings of boundaries that divide up the area of the RAM 80, such as the boundary between the header area and the data area (P1 to P6 in FIG. 18) is implemented by the CPU 66 setting pointers that indicate the addresses of the boundaries, through the CPU interface 60 into the pointer setting registers within the register 46.

If the data area is divided into a plurality of areas as shown in FIGS. 17D, 17E, and 17F, it is preferable that packet data is written into one of this plurality of areas based on packet control information such as tcode, by way of example.

More specifically, assume that the DMAC 44 passes a plurality of data pointers, such as first and second data pointers, to the packet shaping circuit 160 (it is equally possible to pass three or more data pointers in this manner), as shown in FIG. 21. The packet shaping circuit 160 selects the first data pointer from the DMAC 44 during isochronous transfer (or during the second asynchronous transfer of FIG. 17F), by way of example, or the second data pointer from the DMAC 44 during asynchronous transfer (or during the first asynchronous transfer of FIG. 17E). In other words, the packet diagnosis circuit 142 within the packet shaping circuit 160 determines whether this is an isochronous transfer or an asynchronous transfer (or whether it is the second asynchronous transfer or the first asynchronous transfer), based on packet control information such as tcode, and controls the SEL signal based on that determination result. The configuration is such that one of the first and second data pointers that are input to the selector 170 through the buffer 168 is selected thereby. This causes the first data pointer to be embedded in a packet for isochronous transfer (or second asynchronous transfer) and the second data pointer to be embedding in a packet for asynchronous transfer (or first asynchronous transfer). As a result, it is possible to store data continuously in a specific area within the data area. In other words, moving image data from a digital camera can be stored continuously in the data area for isochronous transfer and print data of a printer can be stored continuously in the second data area for asynchronous transfer.

Note that if the data area is divided into a data area for isochronous transfer and a data area for asynchronous transfer and also the data area for asynchronous transfer is further divided into first and second data areas for asynchronous transfer, as shown in FIG. 17E, it is preferable that three data pointers are provided. In other words, the system is provided with a first data pointer indicating the data area for isochronous transfer and second and third data pointers indicating the first and second data areas for asynchronous transfer. This configuration makes it possible to implement the division of the data area as shown in FIG. 17E, in a simple manner.

3.4 Transmission-Side Configuration

Figure 25:
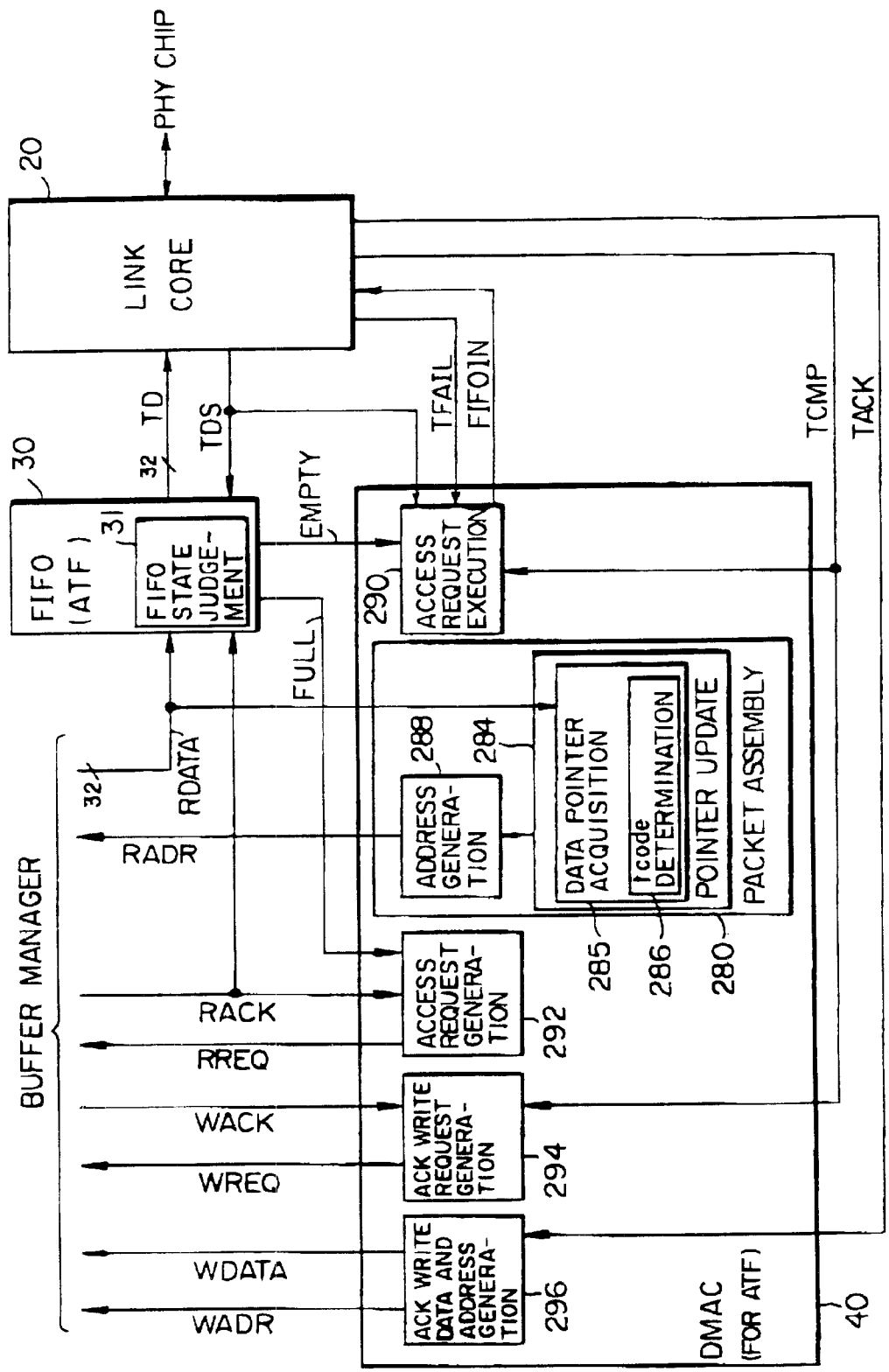
FIG. 25 shows an example of the configuration of the transmission side.

The configuration on the transmission side is described below. A detailed example of the configuration of the FIFO 30 and the DMAC 40 is shown in FIG. 25.

The FIFO 30 functions as a buffer for phase adjustment and comprises a FIFO state judgement circuit 31. The FIFO state judgement circuit 31 makes an EMPTY signal go active when the FIFO is empty and a FULL signal go active when the FIFO is full.

The DMAC 40 comprises a packet assembly circuit 280, an access request execution circuit 290, an access request generation circuit 292, an ACK write request generation circuit 294, and an ACK write data and address generation circuit 296.

The packet assembly circuit 280 reads a header from the header area of the RAM 80 and data from the data area thereof, and assemble a send packet having a frame made up of this header and data (see FIG. 14). The packet assembly circuit 280 comprises a pointer update circuit 284 and an address generation circuit 288.

The pointer update circuit 284 is a circuit for updating header and data pointers used for reading out headers and data from the RAM 80, and it comprises a data pointer acquisition circuit 285. The data pointer acquisition circuit 285 acquires a data pointer from RDATA that is read out from the RAM 80, and it comprises a tcode determination circuit 286.

The address generation circuit 288 receives outputs such as that from the pointer update circuit 284, and issues a read address RADR for the RAM 80.

If the EMPTY signal from the FIFO state judgement circuit 31 is active, the access request execution circuit 290 makes a FIFOIN signal active. The link core 20 makes TDS, which is a strobe signal for TD (TxData), go active on condition that FIFOIN is not active.

Note that TFAIL is a signal used by the link core 20 to inform the access request execution circuit 290 that a transmission has failed.

The access request generation circuit 292 received RACK (which is an acknowledgment read out from the buffer manager 70) and FULL from the FIFO state judgement circuit 31, and outputs RREQ (which is a read request) to the buffer manager 70.

The ACK write request generation circuit 294 receives TCMP from the link core 20 and WACK from the buffer manager 70, and outputs WREQ to the buffer manager 70. The ACK write data and address generation circuit 296 receives TACK from the link core 20, outputs the write-back ACK code for the send packet as WDATA, and outputs the write-back address for ACK code as WADR.

3.5 Transmission-Side Operation

The operation of the transmission side will now be described with reference to the timing waveform chart of FIG. 26.

The description first concerns the operation of the link core 20.

Figure 26:
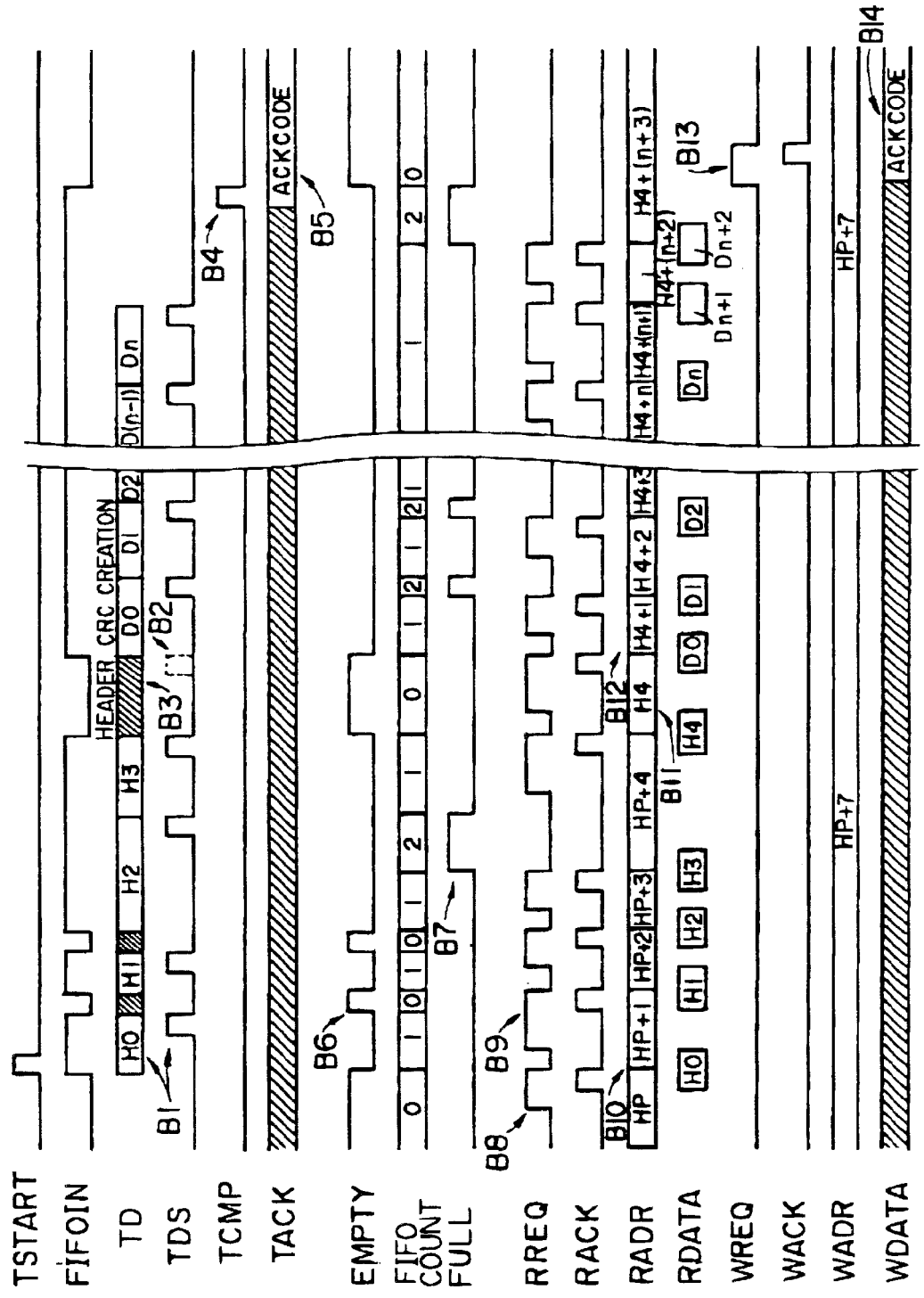
FIG. 26 is a timing waveform chart illustrating the operation of the transmission side.

When TSTART (which posts the start of transmission) goes active, the link core 20 uses the strobe signal TDS to take in TD from the FIFO 30, as shown at B1 in FIG. 26. In this case, TD is taken into the link core 20 in the sequence: header (H0 to H3) then data (D0 to Dn).

Note that the format of the header portion of an asynchronous send packet stored in the header area of the RAM 80 is shown in FIG. 27. As shown in that figure, the fourth quadlet of the header forms a data pointer.

The link core 20 prevents TDS from going active at the position indicated by B2 in FIG. 26. Therefore, the fourth quadlet H4 of the header is not taken into the link core 20, as shown at B3. This is because the fourth quadlet H4 is the data pointer, as shown in FIG. 27, and the link core 20 does not need this data pointer. The link core 20 executes processing for creating the header CRC (see FIG. 23A) for attaching the header, during the period B3.

When the transmission processing for one packet ends, the link core 20 makes TCMP go active as shown at B4. The ACK code (see FIG. 1A) that has been returned from the destination node of the transmission through the PHY chip is output to the DMAC 40 as TACK, as shown at B5. This ACK code is then written back to the header stored in the header area of the RAM 80 (see the seventh quadlet of FIG. 27), by the ACK write request generation is circuit 294 and the ACK write data and address generation circuit 296.

The description now turns to the operation of the FIFO 30.

The FIFO 30 receives RDATA from the buffer manager 70 and outputs it as TD to the link core 20.

The FIFO state judgement circuit 31 within the FIFO 30 uses an internal counter to count the number of data items (FIFO count) in the FIFO 30. When the FIFO 30 becomes empty (when the number of data items is 0), EMPTY becomes active as shown at B6 in FIG. 26. When the FIFO 30 becomes full (when the number of data items 25 is 2), FULL goes active (high) as shown at B7. The fact that the FIFO 30 is empty is conveyed by EMPTY and FIFOIN to the access request execution circuit 290 within the DMAC 40 and the link core 20. The fact that the FIFO 30 is full is conveyed by FULL to the access request generation circuit 292 within the DMAC 40.

The description now turns to the operation of the DMAC 40.

The access request generation circuit 292 makes RREQ go active on condition that FULL is inactive (low) as shown at B8 (indicating that the FIFO 34 is not full). IF RACK from the buffer manager 70 is accepted, RREQ goes inactive.

Note that in this embodiment of the invention, access requests from the DMAC 40 (or the DMAC 42) have the highest priority during bus arbitration for transmission. Therefore, if there is a conflict between RREQ from the DMAC 40 and another access request (Other RREQ) from the CPU interface 60 and the DMAC 54 for ports, RREQ has priority. On the other hand, if there is already another access request from the CPU interface 60 and the DMAC 54 for ports, in front of RREQ, as shown at B9, the access request from the DMAC 40 is made to wait for a given time. Therefore, RDATA from the buffer manager 70 and TD from the link core 20 are not synchronized. For that reason, this embodiment of the invention is provided with the FIFO 30 for adjusting the phases of RDATA and TD.

When transmission starts, the pointer update circuit 284 increments (broadly speaking, updates) the header pointer HP. The address generation circuit 188 issues RADR in accordance with the thus incremented header pointer, as shown at B10 in FIG. 26. Thus the header portion of RDATA is sequentially read from the RAM 80.

When H4 is read as RDATA, the data pointer acquisition circuit 285 within the packet assembly circuit 280 acquires this H4 as the data pointer DP. More specifically, when H0 is read as RDATA, the tcode determination circuit 286 within the data pointer acquisition circuit 285 determines the tcode (see FIG. 27) comprised within H0. If it is determined from the tcode that there is a data pointer in the fourth quadlet of the header, for example, the data pointer acquisition circuit 285 acquires H4 when H4 is read out as RDATA. In other words, H4 of RDATA is acquired as the data pointer and is output as RADR (see B11 in FIG. 26).

Note that the link core 20 in this embodiment of the invention utilizes the period during which the header CRC is being created to acquire the data pointer H4 from RDATA, as shown at B3 and B11. In other words, the creation of the header CRC is done by the link core 20 in this embodiment, so the DMAC 40 does not participate therein. On the other hand, the acquisition of the data pointer is done by the DMAC 40, so the link core 20 does not participate therein. For this reason, this embodiment of the invention positions the data pointer in the fourth quadlet in FIG. 27 where the header CRC is positioned in FIG. 23A. The configuration is such that the period during which the header CRC is created is utilized for acquiring the data pointer H4 from RDATA. This makes it possible to prevent wastage of the processing time.

When the data pointer is being acquired, the pointer update circuit 284 increments H4, which is the acquired data pointer.

The address generation circuit 288 issues RADR in accordance with the incremented data pointer, as shown at B12 in FIG. 26.

Thus the data portion of RDATA is sequentially read from the RAM 80. when the transmission processing for one packet ends, the link core 20 makes TCMP go active as shown at B4 and the ACK write request generation circuit 294 makes WREQ go active as shown at B13. The ACK code that was sent using TACK from the link core 20 to the ACK write data and address generation circuit 296 is output as WDATA, as shown at B14. During this time, HP+7, which is the write address of the ACK code, is output as WADR. This setting of WADR to HP+7 is to write the ACK code back into the seventh quadlet of the header, as shown in FIG. 27.

As described above, it is possible to combine a header in the header area with data in the data area, to assemble a send packet.

A particular feature of this embodiment is that the combining of headers and data is done by the DMAC 40, so it is not necessary for the link core 20 to participate therein. It is therefore possible to simplify the circuit configuration and processing of the link core 20.

In this embodiment, the data pointer acquisition circuit 285 acquires the data pointer (H4) from RDATA then bases the issue of RADR on the thus-acquired data pointer, to read out the data. This makes it possible to combine each header accurately with the data associated with that header. It is therefore possible to simplify the circuit configuration and processing necessary for the combining of headers and data.

4. Electronic Equipment

The description now turns to examples of electronic equipment comprising the data transfer control device of this embodiment.

Figure 29A:
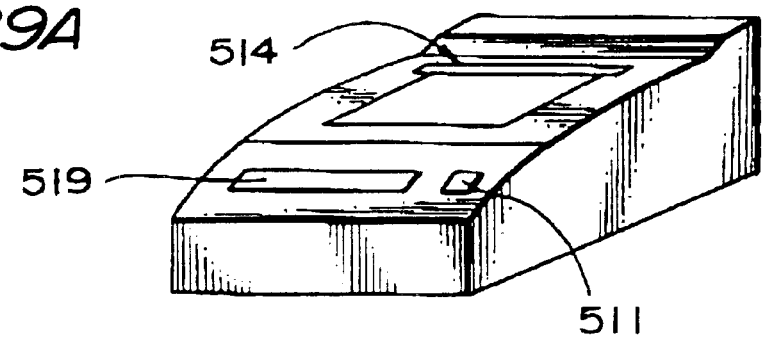
FIGS. 29A, 29B, and 29C show external views of various items of electronic equipment.

An internal block diagram of a printer that is one example of such electronic equipment is shown in FIG. 2BA with an external view thereof being shown in FIG. 29A. A CPU (microcomputer) 510 has various functions, including controlling the entire system. An operating section 511 is designed to allow the user to operate the printer. Data such as a control program and fonts is stored in a ROM 516, and a RAM 518 functions as a work area for the CPU 510. A display panel 519 is designed to inform the user of the operational state of the printer.

Print data that is sent from another node, such as a personal computer, through a PHY chip 502 and a data transfer control device 500 is sent directly to a print processing section 512 over a bus 504. The print data is subjected to given processing by the print processing section 512 and is output for printing to paper by a print section (a device for outputting data) 514.

Figure 28A:
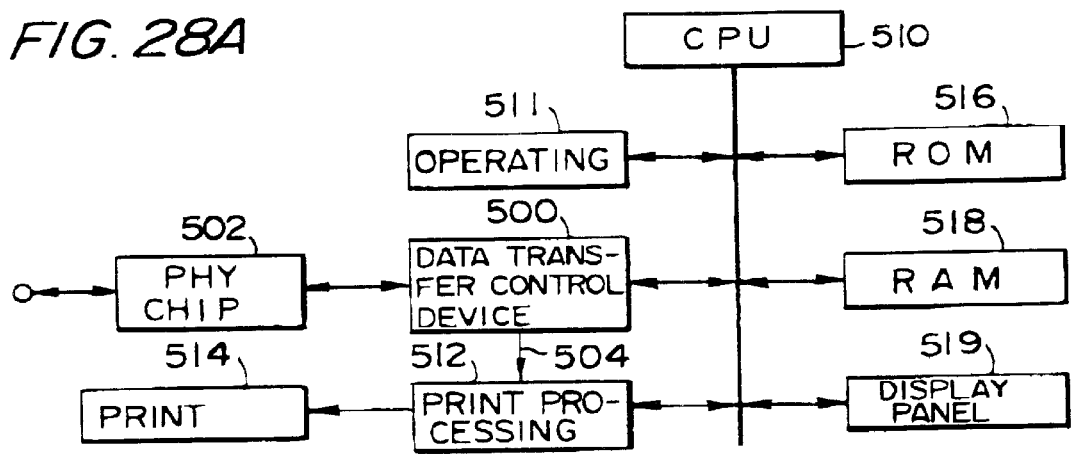
FIGS. 28A, 28B, and 28C show examples of the internal block diagrams of various items of electronic equipment.
Figure 28B:
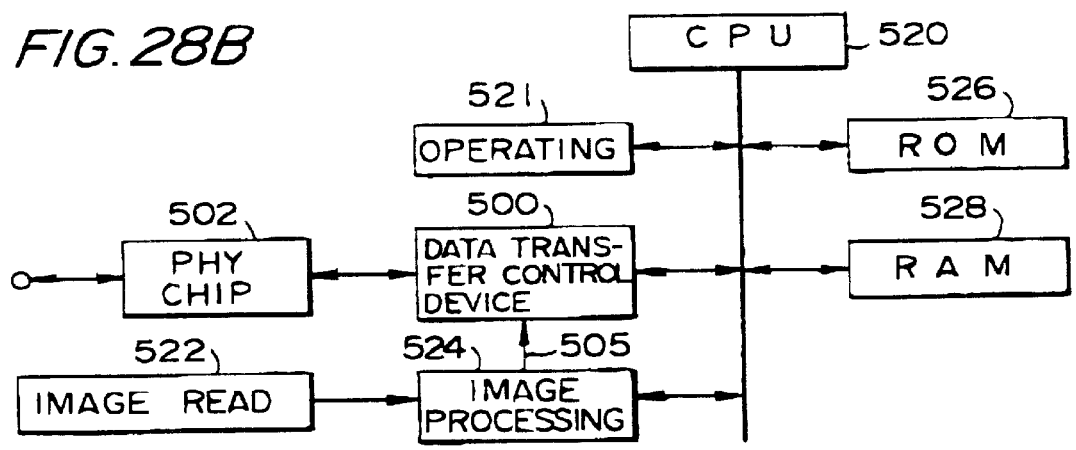
Figure 29B:
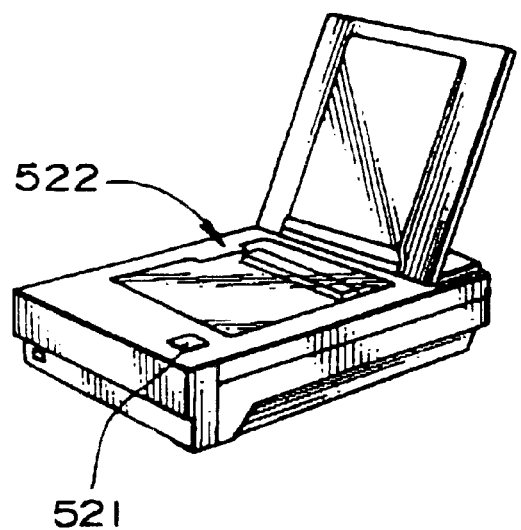

An internal block diagram of a scanner that is another example of electronic equipment is shown in FIG. 28B with an external view thereof being shown in FIG. 29B. A CPU 520 has various functions, including controlling the entire system. An operating section 521 is designed to allow the user to operate the scanner. Data such as a control program is stored in a ROM 526 and a RAM 528 functions as a work area for the CPU 520.

An image of a document is read in by an image read section (a device for taking in data) 522, which comprises components such as a light source and an opto-electric converter, and data of the read-in image is processed by an image processing section 524. The processed image data is sent directly to the data transfer control device 500 over a bus 505. The data transfer control device 500 creates packets by attaching headers and the like to this image data, then sends those packets through the PHY chip 502 to another node such as a personal computer.

Figure 28C:
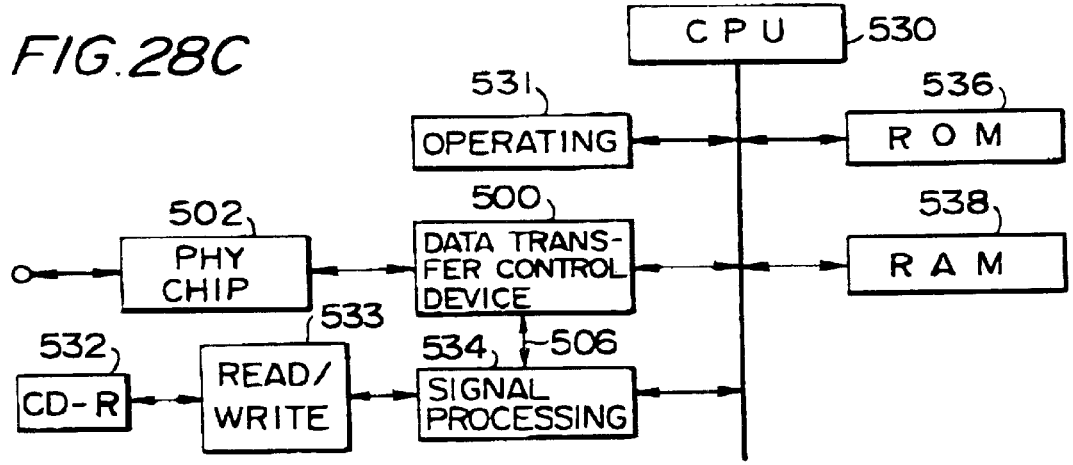
Figure 29C:
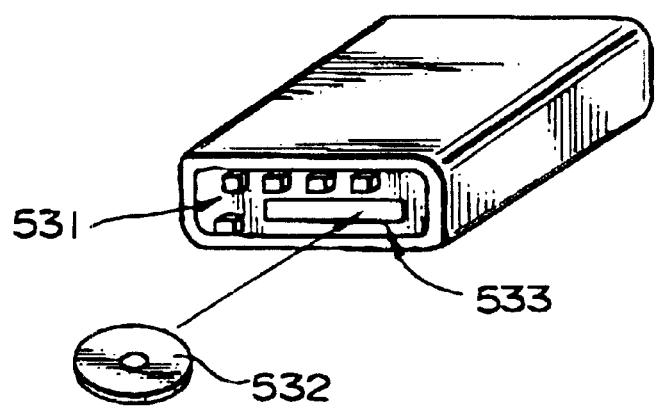

An internal block diagram of a CD-R drive that is a further example of electronic equipment is shown in FIG. 28C with an external view thereof being shown in FIG. 29C. A CPU 530 has various functions, including controlling the entire system. An operating section 531 is designed to allow the user to operate the CD-R. Data such as a control program is stored in a ROM 536 and a RAM 538 functions as a work area for the CPU 530.

Data read out from a CD-R-532 by a read/write section (a device for taking in data or a device for storing data) 533, which comprises components such as a laser, a motor, and an optical system, is input to a signal processing section 534 where it is subjected to given signal processing such as error correction. The data that has been subjected to this signal processing is sent directly to the data transfer control device 500 over a bus 506. The data transfer control device 500 creates packets by attaching headers and the like to this data, then sends those packets through the PHY chip 502 to another node such as a personal computer.

Data that has been sent in from another node through the PHY chip 502 and the data transfer control device 500, on the other hand, is sent directly to the signal processing section 534 over the bus 506. The data is subjected to given signal processing by the signal processing section 534 then is stored by a read/write section 533 in the CD-R 532.

Note that another CPU for data transfer control by the data transfer control device 500 could be provided in addition to the CPU 510, 520, or 530 of FIG. 28A, 28B, or 28C.

Use of the data transfer control device of this embodiment in electronic equipment makes it possible to perform high-speed data transfer. Therefore, if a user wishes to order a printout from a personal computer or the like, the printout can be completed with only a small time lag. Similarly, a user can see a scanned image with only a small time lag after instructing the scanner to take an image. It is also possible to read data from a CD-R or write data to a CD-R at high speeds. The present invention also makes it simple to use a plurality of items of electronic equipment connected to one host system or a plurality of items of electronic equipment connected to a plurality of host systems, for example.

Use of the data transfer control device of this embodiment in electronic equipment also reduces the processing load on firmware running on the CPU, making it possible to use an inexpensive CPU and low-speed buses, which enables reductions in the cost and size of the data transfer control device, thus reducing the cost and size of the electronic equipment.

Note that the electronic equipment that can employ a data transfer control device in accordance with the present invention is not limited to the above described embodiments, so that various other examples can be considered, such as various types of optical disk drive (CD-ROM or DVD), magneto-optic disk drives (MO), hard disk drives, TVs, VTRs, video cameras, audio equipment, telephones, projectors, personal computers, electronic data book, and dedicated wordprocessors.

Note also that the present invention is not limited to the embodiments described herein, and various modifications are possible within the scope of the invention laid out herein.

For example, the configuration of the data transfer control device in accordance with the present invention is preferably that as shown in FIG. 6, but it is not limited thereto.

In addition, it is preferable that the storage means of the present invention is divided into a plurality of areas, but a configuration in which it is not divided is also possible.

Similarly, the present invention is preferably applied to data transfer as defined by the IEEE 1394 standard, but it is not limited thereto. For example, the present invention can also be applied to data transfer in accordance with standards that are based on a similar concept to that of IEEE 1394 or standards that are developed from IEEE 1394.

What is claimed is:

1. A data transfer control device for transferring data among a plurality of nodes that are connected to a bus, said data transfer control device comprising:

link means for providing a service for transferring packets between nodes, including generating tag information for delimiting at least control information and data of a packet, and also linking said tag information to a packet each of the packets including packet control information and packet data, the packet control information including at least one of a source ID, a destination ID and packet type specifying information;

storage means for storing packets, said storage means being randomly accessible, the storage means being divided into a control information area for storing packet control information and a data area for storing packet data;

write means for writing to said storage means a packet that is being transferred from each of said nodes through said link means;

read means for reading out a packet that has been written to said storage means by an upper layer, and transferring the packet to said link means; and packet division means for writing at least packet control information to the control information area and writing packet data to the data area based on the tag information that has been linked to the packet.

2. The data transfer control device as defined in claim 1, wherein data transfer is performed in accordance with the IEEE 1394 standard.

3. The data transfer control device as defined in claim 1, wherein said storage means is divided into an area in which a packet is stored and a work area for a central processing unit.

4. The data transfer control device as defined in claim 1, wherein said control information area of said storage means is divided into a control information area for reception and a control information area for transmission.

5. The data transfer control device as defined in claim 1, said data transfer control device comprising:

a first bus connected to a next stage application;

a second bus that controls said data transfer control device;

a third bus connected electrically to a physical-layer device;

a fourth bus connected electrically to said storage means; and arbitration means for performing arbitration for establishing a data path between any one of said first, second, and third buses and said fourth bus.

6. The data transfer control device as defined in claim 1, further comprising:

a FIFO for reception and a FIFO for transmission that are provided between said link means and said storage means.

7. The data transfer control device as defined in claim 1, wherein said data area of said storage means is divided into a data area for reception and a data area for transmission.

8. The data transfer control device as defined in claim 1, wherein said data area of said storage means is divided into a data area for isochronous transfer and a data area for asynchronous transfer.

9. The data transfer control device as defined in claim 1, wherein:

said data area of said storage means comprises a data area for asynchronous transfer; and said data area for asynchronous transfer is divided into a plurality of areas including first and second data areas for asynchronous transfer.

10. The data transfer control device as defined in claim 1, wherein:

said data area of said storage means is divided into a data area for isochronous transfer and a first data area for asynchronous transfer; and said data area for isochronous transfer is used as a second data area for asynchronous transfer.

11. The data transfer control device as defined in claim 1, wherein:

said data area of said storage means is divided into a plurality of areas; and said data transfer control device further comprises means for writing packet data to any one of the divided areas, based on packet control information.

12. The data transfer control device as defined in claim 1, further comprising:
means for variably controlling a size of each area, when said storage means is divided into a plurality of areas.

13. The data transfer control device as defined in claim 12, wherein a size of each of the areas can be controlled variably and dynamically after power has been applied.

14. The data transfer control device as defined in claim 1, wherein, on condition that said storage means is divided into a plurality of areas, at least one of packet control information and packet data is stored within a divided area from a first boundary to a second boundary thereof, and the storage point of said at least one of packet control information and packet data returns to said first boundary when said storage point reaches said second boundary.

15. The data transfer control device as defined in claim 14, wherein a size of an area for storing at least one of control information and data of one packet is fixed.

16. The data transfer control device as defined in claim 1, said data transfer control device comprising:
a first bus connected to a next stage application;
a second bus that controls said data transfer control device;
a third bus connected electrically to a physical-layer device;
a fourth bus connected electrically to said storage means; and
arbitration means for performing arbitration for establishing a data path between any one of said first, second, and third buses and said fourth bus.

17. The data transfer control device as defined in claim 16, wherein data transfer is performed in accordance with the IEEE 1394 standard.

18. The data transfer control device as defined in claim 4, wherein data transfer is performed in accordance with the IEEE 1394 standard.

19. The data transfer control device as defined in claim 7, wherein data transfer is performed in accordance with the IEEE 1394 standard.

20. A data transfer control device for transferring data among a plurality of nodes that are connected to a bus, the data transfer control device comprising:
a link core which is connectable to a physical-layer device and provides a service for transferring packets between nodes, including generating tag information delimiting at least control information and data of a packet, and also linking the tag information to a packet, each of the packets including packet control information and packet data, the packet control information including at least one of a source ID, a destination ID and packet type specifying information;
a packet RAM which stores packets and is accessible by the link core, a processor and an application-layer device, the packet RAM being divided into a control information area for storing packet control information and a data area for storing packet data;
a write controller which writes to the packet RAM a packet that is being transferred from each of the nodes through the link core;
a read controller which reads out a packet that has been written to the packet RAM by an upper layer, and transfers the packet to the link core; and
a packet divider which writes at least packet control information to the control information area and writes packet data to the data area based on the tag information that has been linked to the packet.

21. The data transfer control device as defined in claim 20, further comprising:
a first bus connectable to the application-layer device;
a second bus connectable to the processor;
a third bus connectable to the physical-layer device;
a fourth bus connectable to the packet RAM;
a first interface which is connectable to the application-layer device through the first bus and provides an interface with the application-layer device;
a second interface which is connectable to the processor through the second bus and provides an interface with the processor;
a buffer manager which is connectable to the packet RAM through the fourth bus and provides an interface with the packet RAM; and
a bus arbiter which arbitrates bus access requests from the first bus side, the second bus side, and the third bus side, and establishes a data path between the fourth bus and one of the first bus, the second bus, and the third bus.

22. The data transfer control device as defined in claim 20, wherein the data area of the packet RAM is divided into a data area for reception and a data area for transmission.

23. The data transfer control device as defined in claim 20, wherein the data area of the packet RAM is divided into a data area for isochronous transfer and a data area for asynchronous transfer.

24. The data transfer control device as defined in claim 20, wherein:
the data area of the packet RAM comprises a data area for asynchronous transfer; and
the data area for asynchronous transfer is divided into a plurality of areas including first and second data areas for asynchronous transfer.

25. The data transfer control device as defined in claim 20, wherein:
the data area of the packet RAM is divided into a data area for isochronous transfer and a first data area for asynchronous transfer; and
the data area for isochronous transfer is used as a second data area for asynchronous transfer.

26. The data transfer control device as defined in claim 20, wherein:
the data area of the packet RAM is divided into a plurality of areas; and
the data transfer control device further comprises a circuit which writes packet data to any one of the divided areas, based on packet control information.

27. The data transfer control device as defined in claim 20, wherein, on condition that the packet RAM is divided into a plurality of areas, at least one of packet control information and packet data is stored within a divided area from a first boundary to a second boundary thereof, and the storage point of the at least one of packet control information and packet data returns to the first boundary when the storage point reaches the second boundary.

28. The data transfer control device as defined in claim 20, further comprising:

a FIFO for reception and a FIFO for transmission that are provided between the link cores and the packet RAM.

29. Electronic equipment comprising:

the data transfer control device as defined in claim 4;

a device for performing given processing on data that has been received from another node via said data transfer control device and said bus; and a device for outputting or storing data that has been subjected to said processing.

30. Electronic equipment comprising:

the data transfer control device as defined in claim 7;

a device for performing given processing on data that has been received from another node via said data transfer control device and said bus; and a device for outputting or storing data that has been subjected to said processing.

31. Electronic equipment comprising:

the data transfer control device as defined in claim 16;

a device for performing given processing on data that has been received from another node via said data transfer control device and said bus; and a device for outputting or storing data that has been subjected to said processing.

32. Electronic equipment comprising:

the data transfer control device as defined in claim 1;

a device for performing given processing on data that is to be sent to another node via said data transfer control device and said bus; and a device for taking in data to be subjected to said processing.

33. Electronic equipment comprising:

the data transfer control device as defined in claim 1;

a device for performing given processing on data that has been received from another node via said data transfer control device and said bus; and a device for outputting or storing data that has been subjected to said processing.

34. Electronic equipment comprising:

the data transfer control device as defined in claim 4;

a device for performing given processing on data that is to be sent to another node via said data transfer control device and said bus; and a device for taking in data to be subjected to said processing.

35. Electronic equipment comprising:

the data transfer control device as defined in claim 7;

a device for performing given processing on data that is to be sent to another node via said data transfer control device and said bus; and a device for taking in data to be subjected to said processing.

36. Electronic equipment comprising:

the data transfer control device as defined in claim 16;

a device for performing given processing on data that is to be sent to another node via said data transfer control device and said bus; and a device for taking in data to be subjected to said processing.

37. Electronic equipment comprising:

the data transfer control device as defined in claims 20, a device which performs given processing on data that has been received from another node via the data transfer control device and the bus; and a device which outputs or stores data that has been subjected to the processing.

* * * * *

UNITED STATES PATENT AND TRADEMARK OFFICE
CERTIFICATE OF CORRECTION

PATENT NO.    : 6,775,245 B1                                             Page 1 of 1
DATED         : August 10, 2004
INVENTOR(S)   : Takao Ogawa et al.

It is certified that error appears in the above-identified patent and that said Letters Patent is hereby corrected as shown below:

Title page,
Item [75], Inventors, should read as follows:
-- [75]  Inventors:    Takao Ogawa, Suwa (JP); Takuya Ishida,
                       Suwa (JP); Yoshiyuki Kamihara, Suwa (JP) --

Signed and Sealed this

First Day of February, 2005

JON W. DUDAS
*Director of the United States Patent and Trademark Office*